US012620322B1

(12) United States Patent
Everest

(10) Patent No.: US 12,620,322 B1
(45) Date of Patent: May 5, 2026

(54) APPARATUS AND METHOD FOR GENERATING A LEARNING ENVIRONMENT COMPRISING AN INTERACTIVE, MULTI-WINDOW GRAPHICAL USER INTERFACE

(71) Applicant: edYou Technologies Inc., Los Angeles, CA (US)

(72) Inventor: Michael Everest, Los Angeles, CA (US)

(73) Assignee: edYou Technologies Inc., Los Angeles, CA (US)

( * ) Notice: Subject to any disclaimer, the term of this patent is extended or adjusted under 35 U.S.C. 154(b) by 0 days.

(21) Appl. No.: 19/044,241

(22) Filed: Feb. 3, 2025

(51) Int. Cl.
| | |
|---|---|
| *G09B 7/04* | (2006.01) |
| *G06F 3/0481* | (2022.01) |
| *G06F 40/35* | (2020.01) |
| *G06F 40/40* | (2020.01) |
| *G06T 7/13* | (2017.01) |

(52) U.S. Cl.
CPC ............ *G09B 7/04* (2013.01); *G06F 3/0481* (2013.01); *G06F 40/35* (2020.01); *G06F 40/40* (2020.01); *G06T 7/13* (2017.01); *G06T 2203/04803* (2013.01); *G06T 2200/24* (2013.01); *G06T 2207/20081* (2013.01)

(58) Field of Classification Search
CPC ......... G09B 7/04; G06T 7/13; G06T 2200/24; G06T 2207/20081; G06F 40/35; G06F 40/40; G06F 3/0481; G06F 2203/04803
See application file for complete search history.

(56) References Cited

U.S. PATENT DOCUMENTS

| | | | |
|---|---|---|---|
| 10,762,902 | B2 | 9/2020 | Garikapati et al. |
| 11,893,464 | B1 * | 2/2024 | Everest .................. G06F 21/31 |
| 2012/0244507 | A1 * | 9/2012 | Tu ............................ G09B 7/00 |
| | | | 434/362 |
| 2013/0109002 | A1 * | 5/2013 | Howard ................... G09B 7/00 |
| | | | 434/350 |
| 2014/0024009 | A1 * | 1/2014 | Nealon .................... G09B 5/12 |
| | | | 434/362 |

(Continued)

FOREIGN PATENT DOCUMENTS

| | | |
|---|---|---|
| CN | 104484178 A | 4/2015 |
| KR | 20240122271 A | 8/2024 |
| WO | 2023064091 A1 | 4/2023 |

*Primary Examiner* — Malina D. Blaise
(74) *Attorney, Agent, or Firm* — Caldwell LLC

(57) ABSTRACT

An apparatus and method for generating a learning environment comprising an interactive, multi-window graphical user interface. The apparatus includes at least a processor and a memory communicatively connected to the at least a processor. The memory instructs the processor to generate a graphical user interface, where in the graphical user interface comprises a first window comprising an interactive workspace and a second window communicatively connected to the first window, display the graphical user interface using a downstream device, receive a first query associated with user input, wherein the first query comprises multimodal data, generate return data as a function of processed multimodal data, modify, using a natural language processor, the return data as a function of an attribute of the processed multimodal data to generate a user specific output, and display the user specific output.

20 Claims, 9 Drawing Sheets

(56)        References Cited

U.S. PATENT DOCUMENTS

| | | | | |
|---|---|---|---|---|
| 2014/0093847 A1* | 4/2014 | Miasnikov | ............... | G09B 7/00 |
| | | | | 434/188 |
| 2017/0084184 A1* | 3/2017 | Yadav | .................... | G09B 19/00 |
| 2018/0350144 A1* | 12/2018 | Rathod | ................... | H04L 51/10 |
| 2019/0335006 A1* | 10/2019 | George | ................ | G06N 3/0464 |
| 2020/0218857 A1* | 7/2020 | Shen | ........................ | G06N 3/09 |
| 2020/0286402 A1* | 9/2020 | He | ....................... | G06N 3/0464 |
| 2023/0050034 A1* | 2/2023 | Ben-Elazar | ......... | G06Q 50/205 |
| 2023/0401614 A1 | 12/2023 | Dohrn | | |
| 2024/0185099 A1 | 6/2024 | Phillips et al. | | |
| 2024/0403697 A1* | 12/2024 | Nordfors | ............. | G06F 16/3329 |
| 2024/0428958 A1* | 12/2024 | Hwang | ................ | G06F 16/635 |

* cited by examiner

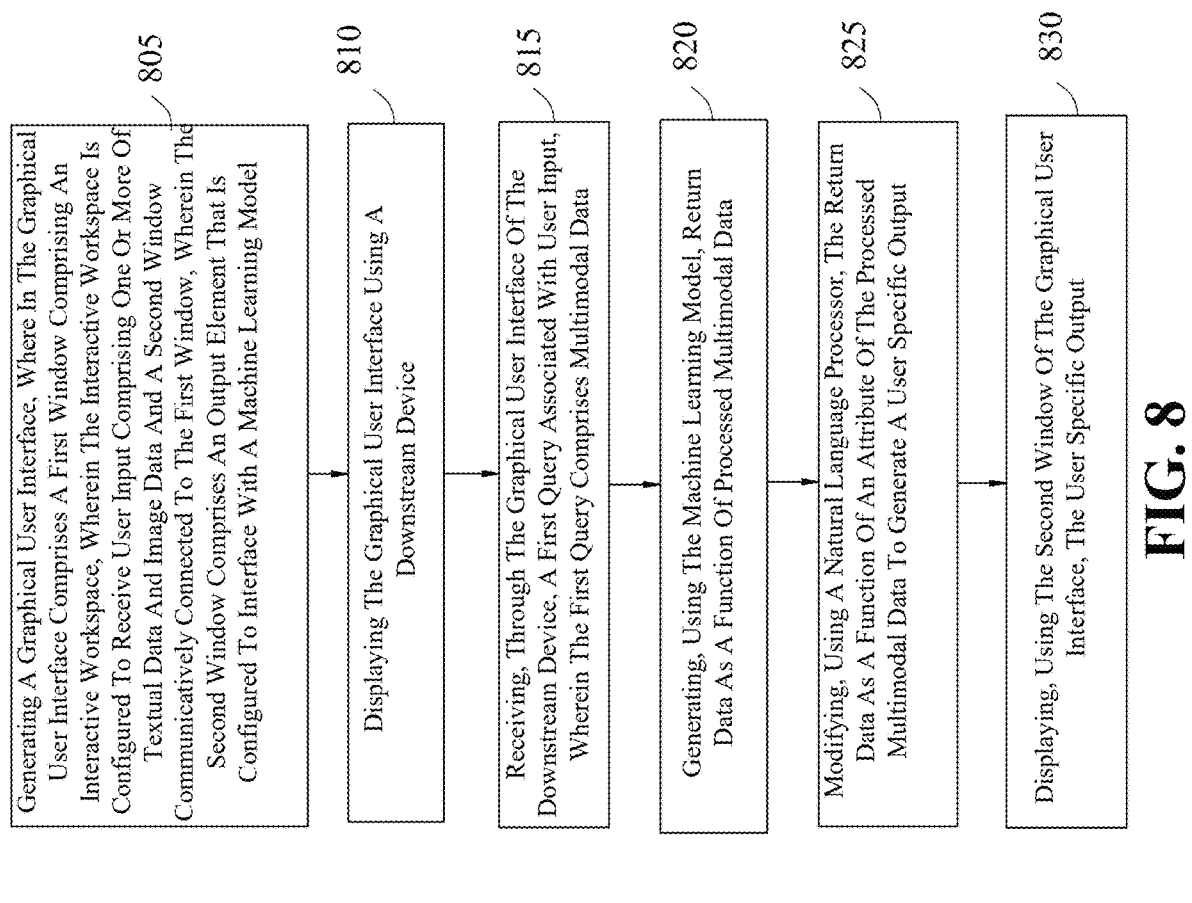

Generating A Graphical User Interface, Where In The Graphical User Interface Comprises A First Window Comprising An Interactive Workspace, Wherein The Interactive Workspace Is Configured To Receive User Input Comprising One Or More Of Textual Data And Image Data And A Second Window Communicatively Connected To The First Window, Wherein The Second Window Comprises An Output Element That Is Configured To Interface With A Machine Learning Model — 805

Displaying The Graphical User Interface Using A Downstream Device — 810

Receiving, Through The Graphical User Interface Of The Downstream Device, A First Query Associated With User Input, Wherein The First Query Comprises Multimodal Data — 815

Generating, Using The Machine Learning Model, Return Data As A Function Of Processed Multimodal Data — 820

Modifying, Using A Natural Language Processor, The Return Data As A Function Of An Attribute Of The Processed Multimodal Data To Generate A User Specific Output — 825

Displaying, Using The Second Window Of The Graphical User Interface, The User Specific Output — 830

APPARATUS AND METHOD FOR GENERATING A LEARNING ENVIRONMENT COMPRISING AN INTERACTIVE, MULTI-WINDOW GRAPHICAL USER INTERFACE

FIELD OF THE INVENTION

The present invention generally relates to the field of interactive graphical user interfaces. In particular, the present invention is directed to an apparatus and a method for generating a learning environment comprising an interactive, multi-window graphical user interface.

BACKGROUND

Current learning systems often lack dynamic, interactive environments that effectively integrate multimodal inputs and provide real-time, user-specific outputs tailored to diverse learning needs. Additionally, existing systems fail to offer seamless, multi-window graphical user interfaces that allow users to simultaneously input, process, and visualize educational content, limiting engagement and personalization.

SUMMARY OF THE DISCLOSURE

In an aspect, an apparatus for generating a learning environment comprising an interactive, multi-window graphical user interface includes at least a processor and a memory communicatively connected to the at least a processor. The memory contains instructions configuring the processor to generate a graphical user interface, where in the graphical user interface comprises a first window comprising an interactive workspace, wherein the interactive workspace is configured to receive user input comprising one or more of textual data and image data and a second window communicatively connected to the first window, wherein the second window comprises an output element that is configured to interface with a machine learning model, display the graphical user interface using a downstream device, receive, through the graphical user interface of the downstream device, a first query associated with user input, wherein the first query comprises multimodal data, generate, using the machine learning model, return data as a function of processed multimodal data, modify, using a natural language processor, the return data as a function of an attribute of the processed multimodal data to generate a user specific output, and display, using the second window of the graphical user interface, the user specific output.

In another aspect, a method for generating a learning environment comprising an interactive, multi-window graphical user interface includes generating a graphical user interface, where in the graphical user interface comprises a first window comprising an interactive workspace, wherein the interactive workspace is configured to receive user input comprising one or more of textual data and image data and a second window communicatively connected to the first window, wherein the second window comprises an output element that is configured to interface with a machine learning model, displaying the graphical user interface using a downstream device, receiving, through the graphical user interface of the downstream device, a first query associated with user input, wherein the first query comprises multimodal data, generating, using the machine learning model, return data as a function of processed multimodal data modifying, using a natural language processor, the return data as a function of an attribute of the processed multimodal data to generate a user specific output, and displaying, using the second window of the graphical user interface, the user specific output.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 8 is a block diagram of an exemplary method for generating a learning environment comprising an interactive, multi-window graphical user interface;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for generating a learning environment comprising an interactive, multi-window graphical user interface. The apparatus includes at least a computing device comprised of a processor and a memory communicatively connected to the processor. The memory instructs the processor to generate a graphical user interface, where in the graphical user interface comprises a first window comprising an interactive workspace, wherein the interactive workspace is configured to receive user input comprising one or more of textual data and image data and a second window communicatively connected to the first window, wherein the second window comprises an output element that is configured to interface with a machine learning model. The processor displays the graphical user interface using a downstream device. The processor receives, through the graphical user interface of the downstream device, a first query associated with user input, wherein the first query comprises multimodal data. Additionally, the processor generates, using the machine learning model, return data as a function of processed multimodal data. The processor modifies, using a natural language processor, the return data as a function of an attribute of the processed multimodal data to generate a user specific output. The memory then instructs the processor to display, using the second window of the graphical user interface, the user specific output.

Figure 1:
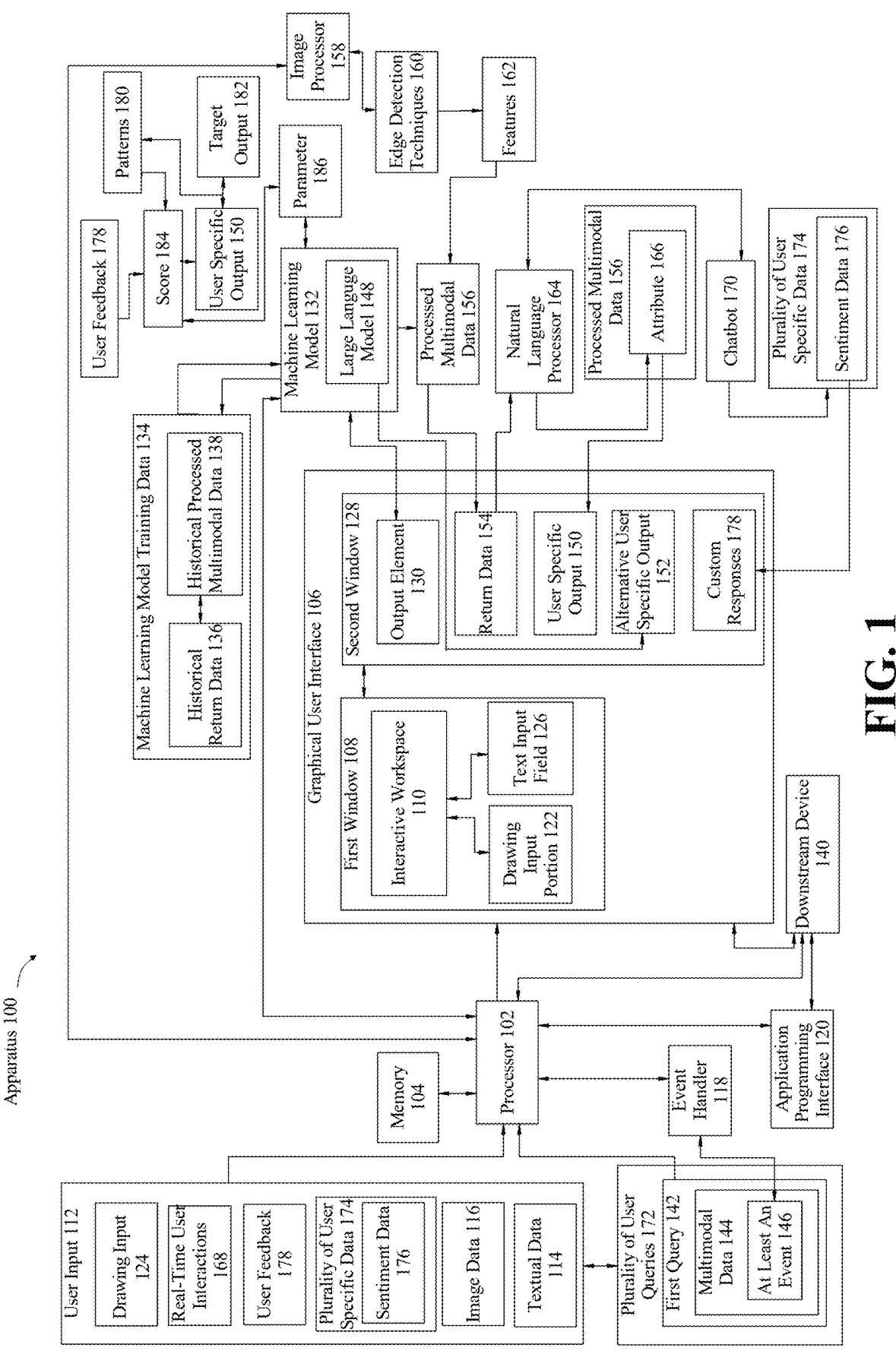
FIG. 1 is a block diagram of an apparatus for generating a learning environment comprising an interactive, multi-window graphical user interface.

Referring now to FIG. 1, an exemplary embodiment of apparatus 100 for generating a learning environment comprising an interactive, multi-window graphical user interface 106 is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor 102. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus 100 computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 102 is configured to generate a graphical user interface 106, where in the graphical user interface 106 includes a first window 108 comprising an interactive workspace 110, wherein the interactive workspace 110 is configured to receive user input 112 comprising one or more of textual data 114 and image data 116. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 106. For example, links to decentralized platforms as described in this disclosure may be incorporated using icons. Using an icon may be a fast way to open documents, run programs etc. because clicking on them yields instant access. In an embodiment, the graphical user interface 106 and an event handler 118 may operate together to enable seamless interaction between the user and the apparatus 100. The GUI serves as the visual and interactive layer through which the user engages with the apparatus 100, presenting elements such as buttons, sliders, input fields, and informational displays. The event handler 118, on the other hand, functions as the underlying mechanism that monitors and responds to user interactions with the GUI. For example, when a user clicks a button on the GUI to request an explanation of a concept, the event handler 118 may detect the click event, identify its context, and trigger the appropriate processes within the apparatus 100 to generate a tailored response. This interplay may ensure dynamic and responsive system behavior, as the event handler 118 processes various input events such as clicks, taps, keystrokes, or voice commands, and relays these inputs to the relevant system components. The GUI subsequently updates to reflect the system's responses, such as displaying user specific output 150, modifying visual elements, or providing real-time feedback. Together, the GUI and event handler 118 create an intuitive and interactive experience, bridging user actions and system functionality to achieve efficient and personalized outcomes.

With continued reference to FIG. 1, an "event handler," as used in this disclosure, is a module, data structure, function, and/or routine that is configured to perform an action in response to an event. For instance, and without limitation, an event handler 118 may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data 114 using a keyboard, touchscreen, speech-to-text program, or the like. Event handler 118 may generate prompts for further information, may compare data to validation rules such as requirements that the data in question be entered within certain numerical ranges, and/or may modify data and/or generate warnings to a user in response to such requirements.

With continued reference to FIG. 1, as used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include data transmitted to display device, client device, and/or graphical user interface 106. In some embodiments, visual element may be interacted with. For example, visual element may include an interface, such as a button or menu. In some embodiments, visual element may be interacted with using a user device such as a smartphone, tablet, smartwatch, or computer. In an embodiment, the apparatus 100 and or the downstream device 140 may include a data structure.

With continued reference to FIG. 1, as used in this disclosure, "data structure" is a way of organizing data represented in a specialized format on a computer configured such that the information can be effectively presented in a graphical user interface 106. In some cases, the data structure includes any input data. In some cases, the data structure contains data and/or rules used to visualize the graphical elements within a graphical user interface 106. In some cases, the data structure may include any data described in this disclosure. In some cases, the data structure may be configured to modify the graphical user interface 106, wherein data within the data structure may be represented visually by the graphical user interface 106. In some cases, the data structure may be continuously modified and/or updated by processor 102, wherein elements within graphical user interface 106 may be modified as a result. In some cases, processor 102 may be configured to transmit display device and or the downstream device 140 the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor 102 may transmit the data described above to a database wherein the data may be accessed from the database. Processor 102 may further transmit the data above to a display device, client device, or another computing device. The data structure may serve as the organizational framework that stores, retrieves, and manages data required for processing events and updating the GUI. The data structure may act as a bridge between the user's input, captured by the event handler 118, and the output displayed on the GUI, ensuring that information is handled efficiently and accurately throughout the interaction. For example, without limitation, when a user interacts with a dropdown menu in the GUI to select a topic, the event handler 118 may capture this input and accesses a data structure, such as a dictionary or tree, that maps each topic to its associated resources or actions. The data structure may retrieve the relevant information such as, text explanations, videos, or interactive exercises, and passes it back to the event handler 118, which may then trigger the appropriate updates to the GUI, such as displaying the selected topic's content. In another embodiment, the data structure may also maintain the state of the system, tracking user progress, preferences, and session history. For instance, without limitation, a hash table may store user specific configurations, such as preferred learning styles or recent activity, which the event handler 118 references when processing interactions. The GUI may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface 106 (GUI) that allows users to perform actions, provide input, or engage with the apparatus 100. Interactive elements may be designed to facilitate two-way communication between the user and the system, enabling the user to influence the behavior of the apparatus 100 or obtain feedback in response to their actions. Examples of interactive elements may include buttons, dropdown menus, sliders, checkboxes, input fields, and hyperlinks. For instance, without limitation, a button labeled "Submit" may allow a user to send their input for processing, while a slider may let the user adjust settings, such as the difficulty level of an educational activity. More advanced interactive elements may include drag-and-drop interfaces, interactive diagrams, or dynamically updating content areas that respond to user actions in real-time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data, such as a user's profile or quiz questions. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles or historical activity. Communication technologies may also help maintain the responsiveness of interactive elements. AJAX (Asynchronous Javascript and XML) may allow the front end to update portions of a web page without requiring a full page reload, enhancing responsiveness. WebSockets may provide real-time interaction capabilities, such as live chats or collaborative tools, by enabling persistent communication between the client and the server. For example, without limitation, a button labeled "Start Quiz" in an educational application may be rendered using HTML and CSS, while JavaScript adds an event listener to detect when the button is clicked. Once clicked, the event listener may send a request to an API 120. The server may process this request, fetch the quiz data, and return it to the front end, which then dynamically displays the quiz interface without requiring the user to reload the page. This combination of technologies may ensure that interactive elements are intuitive, responsive, and capable of handling complex user interactions effectively. Without limitation, the apparatus 100 may include one or more APIs.

With continued reference to FIG. 1, as used in this disclosure, an "application programming interface (API)" is a set of defined protocols, tools, and methods that allow different software applications, systems, or components to communicate and interact with each other. An API 120 may act as an intermediary that enables a client application, such as a user-facing app, to send requests to a server or service and receive the necessary responses, facilitating seamless integration and functionality across diverse systems.

With continued reference to FIG. 1, as used in this disclosure, a "first window" is a graphical user interface element generated by processor 102 that includes an interactive workspace 110. The interactive workspace 110 within the first window 108 is configured to receive user input 112, where the input may include one or more types of data such as textual data 114 and image data 116. The first window 108 serves as a visual and interactive environment for users to engage with the system, enabling functionalities such as entering, modifying, or viewing data in real-time within the specified workspace. In an embodiment, the first window 108 may be left justified, centered, right justified and/or a pop out window within the graphical user interface 106. In an embodiment, the first window 108 may allow users to seamlessly input, view, or modify content within the workspace, thereby enabling a streamlined and efficient user experience. The first window 108 may serve as a functional and visual framework to facilitate these interactions while maintaining accessibility and usability for the user.

With continued reference to FIG. 1, as used in this disclosure, an "interactive workspace" is an area within a graphical user interface 106 configured to facilitate user interaction and input. The interactive workspace 110 may be designed to receive and process various types of user inputs 112, such as textual data 114 entered via a keyboard, image data 116 uploaded or dragged into the workspace, or selections made through touch or mouse input. Additionally and or alternatively, the interactive workspace 110 may support dynamic features, such as real-time feedback, data visualization, or editing capabilities, to enhance the user experience and enable efficient task completion. The interactive workspace 110 may serve as a focal point for users to engage with system functionalities in a flexible and intuitive manner.

With continued reference to FIG. 1, as used in this disclosure, "user input" is data, actions, or commands associated with a user that interacts with the apparatus 100. User input 112 may be received through various input methods, such as typing text into a field, clicking or tapping on an interface, uploading files, using a stylus or finger for drawing, or engaging with audio or video recording features. User input 112 may include textual data 114, image data 116, audio data, video data, keystrokes, mouse clicks, gestures, and the like, or any combination thereof. In a non-limiting example, user input 112 may include a user typing a mathematical equation, drawing a diagram on an interactive workspace 110, uploading a reference image, or verbally asking a question. The apparatus 100 may process this input to generate outputs, perform tasks, or adapt its functionality to meet the user's requirements. Input data may include user feedback 178, real-time user interactions 168, plurality of user specific data 174, sentiment data 176, and the like, as described herein.

With continued reference to FIG. 1, the first window 108 may be configured to provide a drawing input portion 122, wherein the drawing input portion 122 is configured to receive a drawing input 124 from a user and provide a text input field 126, wherein the text input field 126 is configured to receive the textual data 114 from a user. As used in this disclosure, a "drawing input portion" is a designated section within the graphical user interface 106 that is configured to receive and interpret user generated drawing inputs. The drawing input portion 122 may enable users to create or modify graphical elements by drawing directly within the interface using input devices such as a stylus, mouse, and/or touch screen. The drawing input portion 122 may recognize frechand sketches, shapes, annotations, or other visual elements, providing real-time feedback and visual representation of the user's drawing actions. The drawing input portion 122 may be utilized in applications that involve design, illustration, or graphical editing to enhance user interaction and creativity. In a non-limiting example, the drawing input portion 122 may appear as a blank or grid-lined section within the graphical user interface 106, designed to mimic a virtual canvas. The drawing input portion 122 may occupy a specific area of the screen, such as the center or a dedicated panel, and may include features like a toolbar along the edges containing drawing tools such as pencils, brushes, erasers, shape creators, and color palettes. Without limitation, users may interact with the drawing input portion 122 using a stylus, finger, mouse, trackpad, and the like, to create frechand sketches, draw shapes, annotate over an image, and the like. The drawing input portion 122 may display real-time visual feedback, such as lines appearing immediately as they are drawn. It could also include adjustable settings, like line thickness, opacity, or brush styles, allowing for customization. Additional elements like undo/redo buttons, zoom functionality, and layers for more complex drawings may also be integrated into or around this workspace. The drawing input portion 122 may incorporate smooth animations to provide a seamless drawing experience, making the environment intuitive and engaging for users. As used in this disclosure, a "drawing" is a visual representation created by applying graphical elements within a designated workspace. The drawing input 124 may be generated manually by a user through input devices such as a stylus, mouse, touch interface, and the like, or the drawing input 124 may be created programmatically by a system. The drawing input 124 may include frechand sketches, predefined shapes, annotations, or intricate designs. The drawing input 124 may represent concepts, objects, or abstract patterns. The drawing input 124 may incorporate various visual attributes, such as colors, textures, and line styles, to enhance clarity, detail, aesthetic appeal, and the like. In a non-limiting example, the user may interact with the drawing input portion 122 within the interactive workspace 110 to write out a math problem by hand. For instance, without limitation, the user might draw the equation "2x+5=15" using a stylus or finger on a tablet screen. As they write, the apparatus 100 may recognize their handwritten input and dynamically convert it into clean, legible text for better readability, as discussed in more detail below. The apparatus 100 may then provide assistance by breaking the problem into steps as discussed in more detail herein. For example, without limitation, the apparatus 100 may suggest, in the second window 128, subtracting 5 from both sides of the equation, visually illustrating this step within the workspace by crossing out the "+5" on the left-hand side and displaying the updated equation "2x=10." If the user hesitates or makes an error, the apparatus 100 may provide prompts or hints, such as highlighting where the error occurred or displaying an optional step-by-step guide. Throughout the interaction, the drawing input portion 122 may remain active, allowing the user to edit, annotate, or complete the problem manually while engaging with the guidance of the apparatus 100. Without limitation, this combination of freehand input and interactive support may create an engaging and effective learning environment.

With continued reference to FIG. 1, as used in this disclosure, a "text input field" is an area within a graphical user interface 106 that is configured to receive and process textual data 114 entered by a user. The text input field 126 may appear as a box, line, or other visual element where users may type or paste text using an input device such as a keyboard, touchscreen, or the like. The text input field 126 may include features such as a cursor to indicate the input position, placeholder text to guide the user, and/or formatting options like character limits, text alignment, or font styles. The text input field 126 may support additional functionalities, such as auto-complete, spell-checking, or validation, to enhance usability and ensure the accuracy of the entered data. As used in this disclosure, "textual data" is information represented in the form of written or typed text that is composed of characters, symbols, or alphanumeric strings. Textual data 114 may include natural language input, such as sentences, words, or phrases, as well as structured text, such as codes, equations, or formatted documents. Textual data 114 may be input, processed, or stored in various digital or physical formats and may serve as a means of communication, representation, or analysis within the apparatus 100. Examples of textual data 114 may include user-entered notes, commands, responses, descriptive annotations, and the like, in an interactive workspace 110. In a non-limiting example, the user may utilize the text input field 126 within the interactive workspace 110 to enter a specific question or request related to their study needs. For instance, without limitation, the user may type into the text input field 126, "Can you explain the Pythagorean theorem with examples?" or "Generate test prep questions for the SAT math section." Additionally and or alternatively, the user may ask for study material on a specific topic, such as, "Provide practice problems and explanations for understanding chemical bonding in chemistry." Upon receiving this user input 112, the apparatus 100 may analyze the request and provide tailored responses, such as a detailed explanation of the Pythagorean theorem, a set of practice questions for the SAT math section, or relevant examples and exercises related to chemical bonding as explained in more detail below. Without limitation, the input field may support real-time interaction, allowing the user to refine their query or ask follow-up questions for additional clarification or assistance. Continuing, this dynamic functionality may enhance the learning experience by offering targeted and responsive support tailored to the user's educational goals.

Still referring to FIG. 1, the graphical user interface 106 comprises a second window 128 communicatively connected to the first window 108, wherein the second window 128 comprises an output element 130 that is configured to interface with a machine learning model 132. As used in this disclosure, a "second window" is a graphical user interface element generated by the apparatus 100, which is distinct from the first window 108 and is configured to display apparatus 100 generated content. In an embodiment, the second window 128 may provide supplementary functionality such as tools, options, or information that support the user's main task or workflow. For instance, without limitation, if the first window 108 contains an interactive workspace 110 for writing math problems, the second window 128 may display step-by-step problem-solving guidance, provide definitions of mathematical terms, or suggest related resources for further study. Additionally and or alternatively, the second window 128 may allow users to review feedback, explore visualizations, and/or access additional settings. The supplementary functionality may be intended to enrich the user's experience by expanding the capabilities or context provided by the primary interface. The second window 128 may operate independently or in coordination with the first window 108, allowing users to access different features, view complementary information, or perform tasks in parallel. For example, without limitation, the second window 128 may display relevant results, contextual information, and/or suggestions based on user input 112 in the first window 108. The second window 128 may include interactive elements, such as buttons, menus, or input fields, to further engage the user and support efficient multitasking within the apparatus 100.

With continued reference to FIG. 1, as used in this disclosure, an "output element" is a component of the graphical user interface 106 that is configured to communicate results generated by a machine learning model. The output element 130 may include visual, auditory, or other sensory elements to convey data, insights, and/or feedback to the user. The output element 130 may dynamically display the output of the machine learning model 132 in various forms, such as text, charts, images, interactive elements, and the like. For example, without limitation, the output element 130 may present predictions, classifications, and/or suggestions generated by the machine learning model 132, providing the user with actionable or informative content directly within the interactive workspace 110. In a non-limiting example, the output element 130 in the second window 128 may take the form of a visually distinct panel, box, and/or section within the graphical user interface 106, tailored to display the results from the machine learning model 132. For instance, without limitation, the output element 130 may be a text box located at the right-hand side of the second window 128 that dynamically updates to show suggestions, predictions, and/or explanations based on the user input 112 in the first window 108. The location of the output element 130 within the second window 128 may depend on the design intent and user flow. For example, without limitation, the output element 130 may be prominently placed at the center of the second window 128 to draw immediate attention if the output is critical to the task, or the output element 130 may occupy a smaller, collapsible sidebar to allow the user to toggle its visibility. Additional interactive features may be included in the output element 130 such as buttons for expanding details, tooltips for clarification, or filters to customize the displayed output, may also enhance the usability and functionality of the output element 130.

With continued reference to FIG. 1, embeddings may be generated from multimodal data 144 by using specialized encoders, such as autoencoders, convolutional neural networks (CNNs) for images, and transformer-based models like BERT for text. Without limitation, the encoders may process different types of input data, such as text, images, and audio, by mapping them into a shared embedding space, ensuring that their latent representations capture meaningful features in a comparable manner. Multimodal embedding techniques, including joint embedding models and contrastive learning, may be employed to align these representations across different modalities, thereby facilitating downstream tasks that require cross-modal understanding. For example, an autoencoder may reduce the dimensionality of image data while preserving semantic structure, whereas a bi-directional encoder like BERT may generate dense vector representations for textual data that capture contextual dependencies. Ensuring that all embeddings exist in the same embedding space allows for seamless fusion of multimodal data 144, making it possible to perform tasks such as text-to-image retrieval or speech-to-text synthesis more effectively. Once generated, these embeddings may be fed into machine learning model 132 and large language model 148, which are responsible for producing the return data 154. The machine learning model 132 may process these embeddings to perform classification, clustering, or regression tasks, leveraging the unified representation to make predictions or generate insights. In parallel, the large language model 148 may utilize these embeddings to enhance contextual understanding, allowing it to generate more relevant and accurate text responses based on the multimodal data 144. The embeddings may be concatenated, transformed using attention mechanisms, or further refined through additional neural network layers before being passed to these models. Without limitation, by integrating multimodal embeddings into the inference pipeline, the apparatus 100 can generate richer and more context-aware return data, improving the overall performance and user experience.

With continued reference to FIG. 1, a "vector" as defined in this disclosure is a data structure that represents one or more quantitative values and/or measures the position vector. Such vector and/or embedding may include and/or represent an element of a vector space; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where ai is attribute number i of the vector. Scaling and/or normalization may function to make vector comparison independent of absolute quantities of attributes, while preserving any dependency on similarity of attributes. A two-dimensional subspace of a vector space may be defined by any two orthogonal vectors contained within the vector space. Two-dimensional subspace of a vector space may be defined by any two orthogonal and/or linearly independent vectors contained within the vector space; similarly, an n-dimensional space may be defined by n vectors that are linearly independent and/or orthogonal contained within a vector space. A vector's "norm' is a scalar value, denoted ∥a∥ indicating the vector's length or size, and may be defined, as a non-limiting example, according to a Euclidean norm for an n-dimensional vector a as:

$$\|a\| = \sqrt{\sum_{i=0}^{n} a_i^2}$$

With continued reference to FIG. 1, the machine learning model 132 may be iteratively trained using machine learning model training data 134, wherein the machine learning model training data 134 may include historical return data 136 corresponding to historical processed multimodal data. As used in this disclosure, "machine learning model training data" is a dataset composed of labeled or unlabeled examples that are used to teach the machine learning model 132 how to recognize patterns, make predictions, or perform specific tasks. The machine learning model training data 134 may consist of various types of data, including text, images, numerical values, audio, or a combination of these modalities. In a non-limiting example, labeled training data may include pairs of input data and their corresponding desired outputs, such as images of animals labeled with their species or sentences labeled with their sentiment (positive, neutral, or negative). Unlabeled training data, on the other hand, may lack explicit labels and can be used in unsupervised learning tasks to uncover hidden patterns or groupings within the data. The quality, diversity, and size of the machine learning model training data 134 may significantly influence the performance and accuracy of the machine learning model 132. Training data may be preprocessed to remove noise, handle missing values, or standardize formats, ensuring that the model can learn effectively from the examples provided.

With continued reference to FIG. 1, as used in this disclosure, "historical return data" is past outputs generated by the machine learning model 132 in response to previous user inputs 112. The historical return data 136 may include the results, predictions, recommendations, and/or any other outputs produced by the machine learning model 132 during prior interactions with the apparatus 100. Historical return data 136 may serve as a record of the performance and behavior of the machine learning model 132 over time, providing a basis for evaluating trends, refining user experiences, or improving the functionality of the machine learning model 132. In a non-limiting example, historical return data 136 may consist of answers provided by the machine learning model 132 to user-submitted questions like first query 142 or second query, such as prior responses to mathematical problems or suggestions for study material. The historical return data 136 may be stored and used for purposes such as debugging, performance analysis, or informing future responses by leveraging patterns or insights derived from past interactions. As used in this disclosure, "historical processed multimodal data" is previous user input 112 that have been received and processed by the apparatus 100. The previous user input 112 may take the form of multiple modalities, such as text, images, audio, and the like. The historical processed multimodal data 138 may represent a record of the interactions between the user and the apparatus 100, capturing both the content of the user inputs 112 and the processing of the user input 112. In a non-limiting example, historical processed multimodal data 138 may include textual queries entered by the user, images uploaded for analysis, and/or combinations of these, such as a user typing a question while attaching a diagram. The apparatus 100 may store and utilize the historical processed multimodal data 138 to improve future interactions, refine machine learning model 132, and/or generate tailored outputs based on patterns or preferences identified in past user behavior. The historical processed multimodal data 138 may serve as a valuable resource for enhancing the functionality and personalization of the apparatus 100. In a non-limiting example, if a user previously input a question, such as textual data 114, along with an image, visual data, into the first window 108, the apparatus 100 may process the multimodal data to generate an output, such as an answer or recommendation. Over time, the collection of the user inputs 112, or historical processed multimodal data 138, and their corresponding outputs, or historical return data 136, may form a dataset that can be used to retrain or fine-tune the machine learning model 132. This iterative training approach allows the machine learning model 132 to learn from prior interactions, enabling it to adapt to user preferences, correct errors, and enhance its accuracy and relevance in future responses.

Still referring to FIG. 1, processor 102 is configured to display the graphical user interface 106 using a downstream device 140. As used in this disclosure, "downstream device" is a device that accesses and interacts with apparatus 100. Without limitation, the downstream device may access or communicate with, retrieve data from, or receive signals from processor 102 in apparatus 100. For example, if the downstream device is a television, it may access processor 102 via an HDMI connection, wireless casting, like Chromecast, AirPlay, or a streaming protocol where the processor sends video data to the TV. If the downstream device is a phone, it may access processor 102 through a Wi-Fi, Bluetooth, USB, cloud-based connection, and the like, allowing it to display or control the graphical user interface 106 remotely. For instance, and without limitation, downstream device 140 may include a remote device and/or apparatus 100. In a non-limiting embodiment, downstream device 140 may be consistent with a computing device as described in the entirety of this disclosure. Without limitation, the downstream device 140 may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user, wherein a user may interact with a GUI. In some cases, a user may view a GUI through display. Additionally, or alternatively, processor 102 be connected to display device. In one or more embodiments, transmitting the interactive workspace 110 may include displaying the interactive workspace 110 at display device using a visual interface.

Still referring to FIG. 1, processor 102 is configured to receive, through the graphical user interface of the downstream device 140, a first query 142 associated with user input 112, wherein the first query 142 comprises multimodal data 144. As used in this disclosure, a "first query" is an initial request or input provided by the user to the apparatus 100. The first query 142 may be provided to the apparatus 100 using the interactive workspace 110 or text input field 126. In an embodiment, the first query 142 may be submitted by the user for the purpose of obtaining information, performing a task, or generating a response. In an embodiment, the user input 112 comprises the first query 142. The first query 142 may serve as the starting point for interaction with the apparatus 100 and may include various types of data, such as textual questions, image uploads, or other forms of input. In a non-limiting example, the first query 142 may involve a user typing, "What is the formula for calculating the area of a circle?" into the text input field 126 or uploading an image of a geometric problem for analysis. The apparatus 100 may process the first query 142 to generate a corresponding output, such as a direct answer, step-by-step explanation, and/or other relevant information tailored to the user's request.

With continued reference to FIG. 1, as used in this disclosure, "multimodal data" is data that originates from or combines multiple types of input modalities. In an embodiment, multimodal data 144 may include text, images, audio, video, sensor data, and the like. Without limitation, each modality may represent a distinct form of information that contributes to a more comprehensive understanding or analysis of a subject or interaction. Multimodal data 144 may be processed by the apparatus 100, as discussed herein, to leverage the unique attributes of each modality, enabling richer and more accurate outputs. In a non-limiting example, multimodal data 144 may include a user entering a textual query, such as "Explain this equation," while simultaneously uploading an image of a handwritten formula. The apparatus 100 may process both the text and image together to generate a cohesive and informed response, utilizing the strengths of both modalities to provide enhanced functionality or insights. In a non-limiting example, the multimodal data 144 may include diverse inputs collected from the downstream device 140, encompassing various forms of user behavior and interactions. For instance, without limitation, the multimodal data 144 may include audio data, such as the sound of the user sighing, crying, or expressing frustration, which could provide contextual cues about their emotional state during the interaction. Additionally and or alternatively, the multimodal data 144 may include video data from the downstream device 140, such as footage of the user leaving the room, putting their head down in frustration, or displaying other physical behaviors that indicate disengagement or struggle. The multimodal data 144 may capture keystroke data, including patterns of typing speed and errors, or mouse click data, which might reveal that the user is navigating to social media platforms, other websites, or external resources in an attempt to find answers to a problem. Without limitation, by processing and analyzing these different forms of multimodal data 144, the apparatus 100 may gain deeper insights into the user's engagement, focus, or challenges, enabling it to adapt its responses or provide support tailored to the user's needs.

With continued reference to FIG. 1, the multimodal data 144 may include at least an event 146 corresponding to an event handler 118, wherein the at least an event 146 comprises one or more of uploading image data 116 of the multimodal data 144 and submitting textual data 114 of the multimodal data 144. As used in this disclosure, "image data" is information that represents visual content. In an embodiment, image data 116 may include, but is not limited to, pixel values, color information, metadata, and structural attributes of an image. Image data 116 may be captured, processed, transmitted, stored, or displayed using various imaging technologies, such as digital cameras, sensors, or computer-generated graphics. Image data 116 may further include additional attributes such as resolution, depth information, or compression parameters, depending on the format and intended application. As used in this disclosure, an "event" is an occurrence that triggers the apparatus 100 to execute a function through an associated event handler 118. Without limitation, the event may serve as a signal to the apparatus 100, indicating that user interaction or an automated action has occurred, and may prompt the apparatus 100 to respond accordingly. Events may originate from user input 112, system processes, or external sources. In a non-limiting example, the event may include actions such as uploading image data 116 as part of multimodal data 144 or submitting text data through an input field. The event may trigger an event handler 118 to process the uploaded image, analyze the submitted text, or combine both modalities to generate a relevant output. The event may include other user-initiated actions, such as clicking a button, drawing in an interactive workspace 110, or completing a form, each prompting the system to carry out a corresponding function, such as generating feedback, processing data, and/or updating the user interface. In an embodiment, the user may upload an image of a handwritten equation to the apparatus 100. Continuing, the image may serve as an event that triggers an event handler 118 to process the image. Without limitation, the event handler 118 may employ optical character recognition (OCR) to extract the equation from the image and prepare it for further analysis. Similarly, the user may submit textual data 114 by typing a question, such as "Can you solve for x in this equation?" into the text input field 126. Continuing, the submission may constitute an event, prompting the apparatus 100 to analyze the text, match it with the image data 116, and generate a step-by-step solution. In an embodiment, the events may occur independently or simultaneously, allowing the apparatus 100 to handle multimodal data 144 seamlessly. For instance, without limitation, the apparatus 100 may process the uploaded image alongside the submitted text, ensuring the outputs are accurate and tailored to the user's query. The event-driven design enables the system to respond dynamically and efficiently to user interactions, creating an intuitive and engaging experience.

With continued reference to FIG. 1, the machine learning model 132 may include a large language model 148, wherein the large language model 148 configured to receive a second query, adjust the user specific output 150 as a function of the second query, and generate an alternative user specific output 152. As used in this disclosure, "alternative user specific output" is an output format, style, or content tailored to meet a user's particular preferences, instructions, or context-specific requirements, which may differ from the user specific output. This customization ensures the response aligns with the user's individual needs, communication style, or situational constraints. A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters. Non-limiting examples may include user-specific data such as legal study materials, Bar Exam practice questions, LSAT preparation content, law school case summaries, or educational documents tailored to various learning levels. Additional examples may include user interactions like chatbot 170 queries and responses, multimodal data 144 such as uploaded diagrams or handwritten notes, sentiment data 176 derived from user behavior, business-related documents, user communications, emails, advertising content, and the like. In some embodiments, training sets of an LLM may include information from one or more public or private databases. As a non-limiting example, training sets may include databases associated with an entity. In some embodiments, training sets may include portions of documents associated with the electronic records correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on the capability needed such as generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data 174 for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if some words that have already been typed are "Nice to meet", then it may be highly likely that the word "you" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

With continued reference to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data 114 of a dictionary correlated to a prompt in a training data set. A "context vector," as used herein, are fixed-length vector representations useful for document retrieval and word sense disambiguation.

With continued reference to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you", with "how" and "are". It is also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may be a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token.

With continued reference to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question or requests that an action be done. In some embodiments, input may be received from a user device. User device may be any computing device that is used by a user. As non-limiting examples, user device may include desktops, laptops, smartphones, tablets, and the like. In some embodiments, input may include data associated with studying for a specific exam, such as the LSAT, Bar Exam, or a law school final. For instance, the input may consist of a text-based question submitted through a laptop, an image of a handwritten outline uploaded via a smartphone, or a voice-recorded query sent from a tablet. These diverse input types may allow the system to process multimodal data 144 and generate user-specific outputs tailored to the unique needs of the user.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

Still referring to FIG. 1, processor 102 is configured to generate, using the machine learning model 132, return data 154 as a function of processed multimodal data 156. As used in this disclosure, "return data" is output generated by the machine learning model 132, as a function of processed multimodal data 156. The return data 154 may include information, predictions, and/or insights produced after the machine learning model 132 processes and analyzes the multimodal data 144, which may include text, images, audio, video, or other forms of user input 112. In a non-limiting example, return data 154 may include a step-by-step solution to a mathematical problem when the processed multimodal data 156 comprises a combination of a user's handwritten equation and a textual query. The machine learning model 132 may process the user input 112, interpret the relevant features, and generate the return data 154 to address the user's needs or queries. Return data 154 may serve as the response of the apparatus 100, tailored to the context and content of the multimodal input.

With continued reference to FIG. 1, the apparatus 100 may further be configured to generate, using an image processor 158, the processed multimodal data 156 by identifying, using edge detection techniques 160, features 162 of the multimodal data 144. an "image processor" is the technique of modifying or interpreting existing visual elements, such as digitalized photographs. Image processor 158 may include, but is not limited to, image enhancement and restoration, segmentation of features 162 based on an area of interest, registration and fusion of multimodality images, classification of image features 162 through structure characterization, quantitative measurement of image features 162, any combination thereof, and the like. Image processor 158 may include any image processing technique used across various fields including, but not limited to, healthcare, remote sensing, surveillance, entertainment, robotics, and the like. In an embodiment, image processor 158 may include an edge detection technique. An "edge detection technique," as used in this disclosure, includes a mathematical method that identifies points in a digital image, at which the image brightness changes sharply and/or has a discontinuity. In an embodiment, such points may be organized into straight and/or curved line segments, which may be referred to as "edges." Edge detection technique may be performed by image processor 158, using any suitable edge detection algorithm, including without limitation Canny edge detection, Sobel operator edge detection, Prewitt operator edge detection, Laplacian operator edge detection, and/or Differential edge detection. Edge detection technique may include phase congruency-based edge detection, which finds all locations of an image where all sinusoids in the frequency domain, for instance as generated using a Fourier decomposition, may have matching phases which may indicate a location of an edge. Edge detection technique may be used to detect a shape of a feature of interest such as a cell, indicating a cell membrane or wall; in an embodiment, edge detection technique may be used to find closed figures formed by edges.

With continued reference to FIG. 1, in a non-limiting example, identifying one or more features 162 from image data 116 may include isolating one or more areas of interests using one or more edge detection techniques 160. An area of interest may include a specific area within a digital image that contains information relevant to further processing, such as one or more image features 162. In a non-limiting example, image data 116 located outside an area of interest may include irrelevant or extraneous information. Such portion of image data 116 containing irrelevant or extraneous information may be disregarded by image processor 158, thereby allowing resources to be concentrated at a targeted area of interest. In some cases, the area of interest may vary in size, shape, and/or location within image data 116. In a non-limiting example the area of interest may be presented as a circle around the nucleus of a cell. In some cases, the area of interest may specify one or more coordinates, distances, and the like, such as center and radius of a circle around the nucleus of a cell in an image. Image processor 158 may then be configured to isolate the area of interest from image data 116 based on the particular feature. In a non-limiting example, image processor 158 may crop an image according to a bounding box around an area of interest.

With continued reference to FIG. 1, processor 102 may transform a digital image or drawing input 124 into processed multimodal data 156 using a plurality of image processors. As used in this disclosure, a "plurality of image processors" is one or more distinct image processing technique designed to perform specific processing tasks and or operations to the digital image. For example, and without limitation, plurality of image processors may be configured to compile plurality of digital images to create an integrated image. In an embodiment, plurality of image processors may include a plurality of software algorithms that can analyze, manipulate, or otherwise enhance an image, such as, without limitation, a plurality of image processing techniques as described below. Plurality of image processors may include, without limitation, modules that perform modifications such as random rotation, color jitter, Gaussian blur, perspective transform, shear transform, shadow casting, reflected light, ink color swap, moire, noise texturization, Gaussian noise, salt and pepper noise, folding and creasing, crumpled paper effect, and the like, and described in detail above. In a non-limiting example, plurality of image processors may include any combination of plurality of image processors. In some cases, plurality of image processors may be implemented with one or more image processing libraries such as, without limitation, OpenCV, PIL/Pillow, ImageMagick, and the like. Plurality of image processors may include, be included in, or be communicatively connected to processor 102, and/or memory 104.

With continued reference to FIG. 1, in an embodiment, plurality of image processors may be configured to compress and/or encode images to reduce the file size and storage requirements while maintaining the essential visual information needed for further processing steps as described below. In an embodiment, compression and/or encoding of a plurality of images may facilitate faster transmission of images. In some cases, image processors may be configured to perform a lossless compression on images, wherein the lossless compression may maintain the original image quality of images. In a nonlimiting example, plurality of image processors may utilize one or more lossless compression algorithms, such as, without limitation, Huffman coding, Lempel-Ziv-Welch (LZW), Run-Length Encoding (RLE), and/or the like to identify and remove redundancy in each image in a plurality of images without losing any information. In such embodiment, compressing and/or encoding each image of a plurality of images may include converting the file format of each image into PNG, GIF, lossless JPEG2000 or the like. In an embodiment, images compressed via lossless compression may be perfectly reconstructed to the original form (e.g., original image resolution, dimension, color representation, format, and the like) of images. In other cases, plurality of image processors may be configured to perform a lossy compression on plurality of images, wherein the lossy compression may sacrifice some image quality of images to achieve higher compression ratios. In a non-limiting example, plurality of image processors may utilize one or more lossy compression algorithms, such as, without limitation, Discrete Cosine Transform (DCT) in JPEG or Wavelet Transform in JPEG2000, discard some less significant information within images, resulting in a smaller file size but a slight loss of image quality of images. In such embodiment, compressing and/or encoding each image of a plurality of images may include converting the file format of each image into JPEG, WebP, lossy JPEG2000, or the like.

With continued reference to FIG. 1, in an embodiment, processing images may include determining a degree of quality of depiction of a region of interest of an image or a plurality of images. In an embodiment, plurality of image processors may determine a degree of blurriness of images. In a non-limiting example, plurality of image processors may perform a blur detection by taking a Fourier transform, or an approximation such as a Fast Fourier Transform (FFT) of images and analyzing a distribution of low and high frequencies in the resulting frequency-domain depiction of images; for instance, and without limitation, numbers of high-frequency values below a threshold level may indicate blurriness. In another non-limiting example, detection of blurriness may be performed by convolving images, a channel of images, or the like with a Laplacian kernel; for instance, and without limitation, this may generate a numerical score reflecting a number of rapid changes in intensity shown in each image, such that a high score indicates clarity, and a low score indicates blurriness. In some cases, blurriness detection may be performed using a Gradient-based operator, which measures operators based on the gradient or first derivative of images, based on the hypothesis that rapid changes indicate sharp edges in the image, and thus are indicative of a lower degree of blurriness. In some cases, blur detection may be performed using Wavelet-based operator, which takes advantage of the capability of coefficients of the discrete wavelet transform to describe the frequency and spatial content of images. In some cases, blur detection may be performed using statistics-based operators take advantage of several image statistics as texture descriptors in order to compute a focus level. In other cases, blur detection may be performed by using discrete cosine transform (DCT) coefficients in order to compute a focus level of images from its frequency content. Additionally, or alternatively, plurality of image processors may be configured to rank images according to degree of quality of depiction of a region of interest and select a highest-ranking image from a plurality of digital images.

With continued reference to FIG. 1, processing images may include enhancing at least a region of interest via a plurality of image processing techniques to improve the quality (or degree of quality of depiction) of an image for better processing and analysis as described further in this disclosure. In an embodiment, plurality of image processors may be configured to perform a noise reduction operation on an image, wherein the noise reduction operation may remove or minimize noise (arises from various sources, such as sensor limitations, poor lighting conditions, image compression, and/or the like), resulting in a cleaner and more visually coherent image. In some cases, noise reduction operation may be performed using one or more image filters; for instance, and without limitation, noise reduction operation may include Gaussian filtering, median filtering, bilateral filtering, and/or the like. Noise reduction operation may be done by plurality of image processors, by averaging or filtering out pixel values in neighborhood of each pixel of an image to reduce random variations.

With continued reference to FIG. 1, in another embodiment, plurality of image processors may be configured to perform a contrast enhancement operation on an image. In some cases, an image may exhibit low contrast, which may, for example, make a feature difficult to distinguish from the background. Contrast enhancement operation may improve the contrast of an image by stretching the intensity range of the image and/or redistributing the intensity values (i.e., degree of brightness or darkness of a pixel in the image). In a non-limiting example, intensity value may represent the gray level or color of each pixel, scale from 0 to 255 in intensity range for an 8-bit image, and scale from 0 to 16,777,215 in a 24-bit color image. In some cases, contrast enhancement operation may include, without limitation, histogram equalization, adaptive histogram equalization (CLAHE), contrast stretching, and/or the like. Plurality of image processors may be configured to adjust the brightness and darkness levels within an image to make a feature more distinguishable (i.e., increase degree of quality of depiction). Additionally, or alternatively, plurality of image processors may be configured to perform a brightness normalization operation to correct variations in lighting conditions (i.e., uneven brightness levels). In some cases, an image may include a consistent brightness level across a region after brightness normalization operation performed by plurality of image processors. In a non-limiting example, plurality of image processors may perform a global or local mean normalization, where the average intensity value of an entire image or region of an image may be calculated and used to adjust the brightness levels.

With continued reference to FIG. 1, in other embodiments, plurality of image processors may be configured to perform a color space conversion operation to increase degree of quality of depiction. In a non-limiting example, in case of a color image (i.e., RGB image), plurality of image processors may be configured to convert RGB image to grayscale or HSV color space. Such conversion may empha-size the differences in intensity values between a region or feature of interest and the background. Plurality of image processors may further be configured to perform an image sharpening operation such as, without limitation, unsharp masking, Laplacian sharpening, high-pass filtering, and/or the like. Plurality of image processors may use image sharpening operation to enhance the edges and fine details related to a region or feature of interest within an image by emphasizing high-frequency components within an image.

With continued reference to FIG. 1, processing images may include isolating a region or feature of interest from the rest of an image as a function of plurality of image process-ing techniques. Images may include highest-ranking image selected by plurality of image processors as described above. In an embodiment, plurality of image processing techniques may include one or more morphological operations, wherein the morphological operations are techniques developed based on set theory, lattice theory, topology, and random functions used for processing geometrical structures using a structuring element. A "structuring element," for the purpose of this disclosure, is a small matrix or kernel that defines a shape and size of a morphological operation. In some cases, structing element may be centered at each pixel of an image and used to determine an output pixel value for that location. In a non-limiting example, isolating a region or feature of interest from an image may include applying a dilation operation, wherein the dilation operation is a basic morpho-logical operation configured to expand or grow the bound-aries of objects (e.g., a cell, a dust particle, and the like) in an image. In another non-limiting example, isolating a region or feature of interest from an image may include applying an erosion operation, wherein the erosion operation is a basic morphological operation configured to shrink or erode the boundaries of objects in an image. In another non-limiting example, isolating a region or feature of inter-est from an image may include applying an opening opera-tion, wherein the opening operation is a basic morphological operation configured to remove small objects or thin struc-tures from an image while preserving larger structures. In a further non-limiting example, isolating a region or feature of interest from an image may include applying a closing operation, wherein the closing operation is a basic morpho-logical operation configured to fill in small gaps or holes in objects in an image while preserving the overall shape and size of the objects. These morphological operations may be performed by plurality of image processors to enhance the edges of objects, remove noise, or fill gaps in a region or feature of interest before further processing.

With continued reference to FIG. 1, in an embodiment, isolating a region or feature of interest from an image may include utilizing an edge detection technique, which may detect one or more shapes defined by edges. An "edge detection technique," as used in this disclosure, includes a mathematical method that identifies points in a digital image, at which the image brightness changes sharply and/or has a discontinuity. In an embodiment, such points may be organized into straight and/or curved line segments, which may be referred to as "edges." Edge detection technique may be performed by plurality of image processors, using any suitable edge detection algorithm, including without limita-tion Canny edge detection, Sobel operator edge detection, Prewitt operator edge detection, Laplacian operator edge detection, and/or Differential edge detection. Edge detection technique may include phase congruency-based edge detec-tion, which finds all locations of an image where all sinu-soids in the frequency domain, for instance as generated using a Fourier decomposition, may have matching phases which may indicate a location of an edge. Edge detection technique may be used to detect a shape of a feature of interest such as a cell, indicating a cell membrane or wall; in an embodiment, edge detection technique may be used to find closed figures formed by edges.

With continued reference to FIG. 1, in a non-limiting example, identifying one or more features 162 from image data 116 may include isolating one or more areas of interests using one or more edge detection techniques 160. An area of interest may include a specific area within a digital image that contains information relevant to further processing, such as one or more image features 162. In a non-limiting example, image data 116 located outside an area of interest may include irrelevant or extraneous information. Such portion of image data 116 containing irrelevant or extrane-ous information may be disregarded by plurality of image processors, thereby allowing resources to be concentrated at a targeted area of interest. In some cases, the area of interest may vary in size, shape, and/or location within image data 116. In a non-limiting example the area of interest may be the ECG trace. In some cases, the area of interest may specify one or more coordinates, distances, and the like. Plurality of image processors may then be configured to isolate the area of interest from image data 116 based on the particular feature. In a non-limiting example, plurality of image processors may crop an image according to a bound-ing box around an area of interest.

With continued reference to FIG. 1, plurality of image processors may be configured to perform a connected com-ponent analysis (CCA) on an image for feature of interest isolation. As used in this disclosure, a "connected compo-nent analysis (CCA)," also known as connected component labeling, is an image processing technique used to identify and label connected regions within a binary image (i.e., an image which each pixel having only two possible values: 0 or 1, black or white, or foreground and background). "Con-nected regions," as described herein, is a group of adjacent pixels that share the same value and are connected based on a predefined neighborhood system such as, without limita-tion, 4-connected or 8-connected neighborhoods. In some cases, plurality of image processors may convert an image into a binary image via a thresholding process, wherein the thresholding process may involve setting a threshold value that separates the pixels of an image corresponding to feature of interest (foreground) from those corresponding to the background. Pixels with intensity values above the threshold may be set to 1 (white) and those below the threshold may be set to 0 (black). In an embodiment, CCA may be employed to detect and extract feature of interest by identifying a plurality of connected regions that exhibit specific properties or characteristics of the feature of inter-est. Plurality of image processors may then filter plurality of connected regions by analyzing plurality of connected regions properties such as, without limitation, area, aspect ratio, height, width, perimeter, and/or the like. In a non-limiting example, connected components that closely resemble the dimensions and aspect ratio of feature of interest may be retained, by plurality of image processors as feature of interest, while other components may be dis-carded. Plurality of image processors may be further con-figured to extract feature of interest from an image for further processing.

With continued reference to FIG. 1, processor 102 may transform uploaded digital images or drawings 124 into processed multimodal data 156 using plurality of image processors configured to receive digital image from the digital image repository and modify the digital image. One or more digital image may be transmitted from processor 102 to plurality of image processors via any suitable electronic communication protocol, including without limitation packet-based protocols such as transfer control protocolinternet protocol (TCP-IP), file transfer protocol (FTP) or the like. Receiving images may include retrieval of digital image from a data store containing images as described below; for instance, and without limitation, images may be retrieved using a query that specifies a timestamp that images may be required to match.

Still referring to FIG. 1, processor 102 is configured to modify, using a natural language processor 164, the return data 154 as a function of an attribute 166 of the processed multimodal data 156 to generate a user specific output 150. As used in this disclosure, a "natural language processor (NLP)" is a component designed to analyze, interpret, and process human language in its natural form. For instance, the NLP 164 may receive as input various types of data including, but not limited to, text data or auditory data. A natural language processor 164 may utilize techniques from computational linguistics, artificial intelligence, and machine learning to understand the structure, meaning, and context of language and generate appropriate responses or actions based on the input. For example, without limitation, the natural language processor 164 may parse a user's query, such as "Explain the process of photosynthesis," to identify the main topic "photosynthesis" and the request type "explanation". The NLP 164 may then retrieve or generate a detailed response tailored to the query. In another instance, the natural language processor 164 may analyze spoken commands like "Set a timer for 10 minutes" by converting the audio input to text, extracting the intent (to set a timer), and executing the command within the system. The natural language processor 164 may enable the apparatus 100 to engage in intuitive and effective interactions with users by interpreting natural language inputs and producing relevant outputs.

With continued reference to FIG. 1, as used in this disclosure, an "attribute" is a characteristic, property, or quality associated with a particular object, entity, or dataset. Attributes 166 may describe specific features 162 or aspects of the object or entity, serving as data points that can be processed, analyzed, or utilized by the apparatus 100. Attributes 166 may vary in type and may include textual, numerical, categorical, or visual elements, depending on the context in which they are used. In a non-limiting example, the attribute 166 of the processed multimodal data 156 may represent characteristics or qualities associated with the user, such as their age, demographic, education level, mood, or other relevant factors. Without limitation, the attribute 166 may be derived from the user input 112 or interaction patterns within the apparatus 100. For instance, the apparatus 100 may infer the user's mood based on audio data, such as tone or vocal patterns, or determine their education level based on the complexity of the text input. Similarly, demographic details, such as age or geographic location, may be associated with the user through prior data or account settings. Continuing the attributes 166 may allow the NLP 164 to tailor its responses, ensuring that the user specific output 150 aligns with the user's background, preferences, and/or current state, thereby enhancing the relevance and personalization of the interaction. In another non-limiting example, the NLP 164 may infer the user's age by analyzing their writing style, the complexity of their vocabulary, or the types of problems they input, such as basic arithmetic for younger users versus calculus for more advanced users. The attribute 166 associated with the user demographic may be derived from location-based metadata or cultural cues in the user input 112, enabling the NLP 164 to adapt responses to align with region-specific conventions or preferences. Additionally and or alternately, the user's education level may be estimated by the apparatus 100 based on the technical depth of their queries or the subjects they are engaging with, such as beginner-level algebra versus advanced physics. The user's mood may be inferred from audio data, such as a frustrated tone in speech, or video data, like visual cues of the user putting their head down or leaving the workspace. Without limitation the attribute 166, whether individually or collectively, may guide the NLP 164 to generate user specific outputs 150 that are both personalized and contextually relevant. For example, a younger user struggling with a math problem may receive more visual aids and simplified explanations, while a frustrated user might receive encouragement or suggestions to help them refocus. The user specific outputs 150 may allow the apparatus 100 to provide a more effective and user-centric experience. As used in this disclosure, "user specific output" is data generated by the NLP 164 that is tailored to individual users. The user specific output 150 may be derived from processing user input 112, historical data, contextual information, or a combination thereof, ensuring the response is relevant and personalized to the user's query or interaction. In a non-limiting example, user specific output 150 may include a step-by-step explanation for solving a math problem entered by the user, suggestions for additional study material based on the user's past queries, or visual annotations on an uploaded diagram to clarify a specific concept. The user specific output 150 may be designed to enhance the user experience by providing targeted and meaningful responses that address the user's unique requirements or goals.

With continued reference to FIG. 1, the second window 128 may be arranged adjacent to the first window 108, wherein the second window 128 may be configured to display the user specific output 150 and dynamically provide updates to the user specific output 150 based on real-time user interactions 168. In a non-limiting example, the second window 128 may be positioned adjacent to the first window 108 within the graphical user interface 106, creating a cohesive and interactive workspace 110 for the user. The second window 128 may be specifically designed to display user specific output 150, which is tailored to the individual based on their input, preferences, and/or attributes 166. For example, without limitation, if the user input 112 includes a math problem in the first window 108, the second window 128 may display a detailed, step-by-step solution tailored to the user's education level, such as breaking down concepts into simpler terms for beginners or offering advanced methods for experienced users. This adjacency may allow users to seamlessly view their input and the corresponding user specific output 150 in a single interface, promoting an intuitive and efficient experience. Without limitation, the second window 128 may be configured to dynamically update the user specific output 150 in real-time based on the user's interactions. For instance, without limitation, if the user modifies their input in the first window 108, such as changing a math equation or uploading a different image, the second window 128 may instantly recalculate and display the updated results, ensuring the user specific output 150 remains accurate and relevant. Additionally and or alternatively, if the apparatus 100 detects patterns of hesitation or frustration, such as the user repeatedly retyping their query or taking long pauses, the second window 128 may proactively display helpful hints, alternative approaches, or encouragement to guide the user through the process. Continuing, this dynamic functionality may ensure that the user receives adaptive support that evolves in sync with their actions. In another example, the second window 128 may go beyond simple outputs by incorporating additional contextual or supplementary information to enhance the user experience. For instance, without limitation, if the user input 112 includes a question about solving a physics problem, the second window 128 may display the solution and provide links to related study materials, visual diagrams, or video tutorials. If the apparatus 100 detects that the user is switching focus, such as navigating away from the interactive workspace 110 or interacting with unrelated content, the second window 128 may automatically adjust its display to prompt the user to refocus, perhaps by offering a progress summary or highlighting unfinished tasks. Without limitation, this real-time adaptability mya create a dynamic and personalized interface that empowers users to stay engaged, informed, and supported throughout their interaction.

With continued reference to FIG. 1, the apparatus 100 may further include an application programming interface 120 compatible with the interactive workspace 110, wherein the application programming interface 120 is configured to receive and transmit the multimodal data 144 between the downstream device 140 and the apparatus 100 and provide dynamic updates of the user specific output 150 within the interactive workspace 110. As used in this disclosure, an "application programming interface" (API) is a set of defined protocols, tools, and specifications that enable communication and interaction between different software applications, systems, or components. An API 120 may serve as an intermediary that allows developers to access specific functionalities or data provided by a software program, service, or hardware without requiring direct access to its internal code or implementation. In a non-limiting example, an API 120 may provide endpoints that allow a third-party application to request and retrieve information, such as weather data, user account details, or machine learning outputs, from a server. The API 120 may include methods for sending data to the apparatus 100, such as uploading images, submitting queries, or executing commands. Without limitation, by abstracting the underlying complexity, APIs enable seamless integration between diverse systems and facilitate the development of modular, scalable, and interoperable software solutions. In a non-limiting example, an application programming interface 120 may facilitate data exchange between a downstream device 140, such as a user's computer, and the apparatus 100 by enabling the user to upload multimodal data 144 for processing. For instance, without limitation, the API 120 may include an endpoint that allows the user's computer to send a request containing an image of a handwritten mathematical equation. The apparatus 100 may use this data to perform optical character recognition and return a structured representation of the equation to the downstream device 140. Continuing, this interaction may include metadata, such as the timestamp of the request and the user's preferences for how the solution should be displayed (e.g., step-by-step instructions or a summary answer). In another non-limiting example, real-time user interaction facilitated by the API 120, where text and keystroke data from the downstream device 140 are continuously exchanged with the apparatus 100. For example, the user typing a query into the first window 108 of the interactive workspace 110, such as "How do I calculate the derivative of x73+5x?" may trigger the apparatus 100 to dynamically generate relevant results using the machine learning model 132. As the user types additional information or modifies their input, the API 120 may ensure the apparatus 100 receives the updated query in real-time and returns refined results to the downstream device 140. This bidirectional data exchange may allow the apparatus 100 to remain responsive and adaptive to user actions. Additionally and or alternatively, the API 120 may enable the apparatus 100 to send supplementary output to the downstream device 140, enhancing the user experience. For example, without limitation, the API 120 may allow the apparatus 100 to push contextual study material, such as video tutorials or interactive graphs, to the user's computer in response to the user input 112. For instance a user may upload an image of a physics problem involving projectile motion; the apparatus 100 may analyze the problem and return a breakdown of the solution, accompanied by a dynamically generated simulation. The API 120 may ensure seamless integration of these resources into the user's device, enabling a comprehensive and interactive learning experience that is both efficient and engaging.

Still referring to FIG. 1, processor 102 is configured to display, using the second window 128 of the graphical user interface 106, the user specific output 150. In a non-limiting example, processor 102 may be configured to display, using the second window 128 of the graphical user interface 106, user specific output 150 tailored to a student studying for the LSAT, a law school exam, or the Bar Exam. It may be derived that this student is a visual learner. Continuing, for this student the second window 128 may present dynamic and interactive visual aids designed to enhance the student's understanding and retention. For instance, without limitation, the apparatus 100 may display diagrams of legal reasoning structures, such as flowcharts illustrating how to analyze issue-spotting questions, and/or bar graphs breaking down multiple-choice section performance by question type. In an embodiment, the second window 128 may include animations that visually demonstrate concepts like applying legal precedents, alongside step-by-step annotations to help the student connect complex ideas. Additionally and or alternatively, the second window 128 may provide visual flashcards, highlighted text examples, and/or interactive quizzes with immediate feedback, ensuring the user specific output 150 aligns with the student's preferred learning style. In another embodiment, for a deaf student preparing for these same exams, the second window 128 may include specialized user specific output 150 that provides additional visual and written aids to accommodate their needs. In this case, the apparatus 100 may display closed captions for any video explanations, ensuring the student has access to detailed subtitles that break down key concepts in real-time. If the apparatus 100 generates auditory explanations, it may also convert this information into written summaries or transcripts displayed directly within the second window 128. Furthermore, the second window 128 may emphasize visual clarity by using bolded headings, color-coded sections, and large, legible fonts to ensure accessibility. For example, when teaching logical reasoning, the apparatus 100 may present a visually highlighted breakdown of arguments, including labeled premises, conclusions, and logical flaws, making the material casier to interpret without reliance on auditory cues. In both scenarios, the second window 128 may adapt in real-time to the student's interactions. If the visual learner struggles with a particular concept, such as conditional reasoning, the apparatus 100 might automatically provide additional diagrams or videos to reinforce understanding. Similarly, for the deaf student, the apparatus 100 may offer additional written examples, alternative explanations, or interactive exercises to ensure the material is fully accessible. Continuing, this dynamic output may ensure that the processor 102 delivers personalized and inclusive educational support, tailored to the unique learning styles and needs of each user.

With continued reference to FIG. 1, the apparatus 100 may include a chatbot 170, wherein the chatbot 170 is configured to receive a plurality of user queries 172, respond to the plurality of user queries 172, wherein responding to the plurality of queries comprises retrieving a plurality of user specific data 174 of the input data, analyzing sentiment data 176 of the user specific data 174, and generating, using the natural language processor 164, custom responses as a function of the user specific data 174 and the sentiment data 176. As used in this disclosure, a "chatbot" is a program designed to simulate human-like conversations and interactions with users through text or voice-based communication interfaces. The chatbot 170 may use natural language processing to understand the user input 112, generate custom responses, and perform tasks based on the plurality of user queries 172 or commands. In a non-limiting example, the chatbot 170 may be used by a middle school student who needs help with math homework. The student may type, "How do I calculate the area of a triangle?" into the chatbot 170 interface. The chatbot 170 may respond with a step-by-step explanation, such as defining the formula "Area=½× base×height" and asking the student to input the base and height values. If the student provides their answers, such as "base=10 cm, height=5 cm," the chatbot 170 may calculate the area and display the result as "25 square centimeters." To engage younger users, the chatbot 170 may also provide visual aids, such as diagrams of triangles, and incorporate gamified elements, like quizzes or badges, to encourage learning. In another non-limiting example, a high school student preparing for the SAT may use the chatbot 170 to practice vocabulary or critical reading skills. The student may ask, "What does the word 'mitigate' mean?" and the chatbot 170 may define the term, provide synonyms, and/or use it in a sentence. Continuing, to support learning retention, the chatbot 170 may generate multiple-choice questions or short quizzes on related vocabulary. For more advanced assistance, the chatbot 170 may analyze the student's incorrect answers from previous sessions and tailor new questions to address their weak areas, ensuring a personalized learning experience. For students with learning differences, the chatbot 170 may adapt its responses, such as using simpler language or providing audio explanations for visual learners. In another non-limiting example, the chatbot 170 may assist a law student preparing for an exam on constitutional law. The student may ask complex questions, such as "Can you explain the principles established in Marbury v. Madison?" The chatbot 170 may provide a detailed summary of the case, its historical significance, and/or its role in establishing judicial review. For students with accessibility needs, such as a hearing impairment, the chatbot 170 may offer written transcripts of audio resources or provide additional resources, like video lectures with closed captions. Regardless of the student's age, demographic, or education level, the chatbot 170 may dynamically adapt its outputs to align with the user's topic, preferred learning style, and knowledge level, making it a versatile and inclusive educational tool.

With continued reference to FIG. 1, as used in this disclosure, "user specific data" is information that is uniquely associated with an individual user and is utilized to personalize the outputs of the apparatus 100 to the user's needs. The user specific data 174 may include explicit input provided by the user, such as text queries, uploaded files, or preferences, as well as implicit data collected through their behavior, interactions, or historical usage patterns within the apparatus 100. In a non-limiting example, user specific data 174 may include demographic details such as age, location, or education level; learning preferences like being a visual or auditory learner; performance history, such as past questions asked or topics reviewed; and contextual data, such as the time of day or the device being used. The user specific data 174 may allow the chatbot 170 to generate tailored responses, such as providing simplified explanations for a younger user, offering advanced resources for a law student, or delivering closed captions for a user with hearing impairments. Continuing, by leveraging user specific data 174, the chatbot 170 may ensure a more relevant, effective, and personalized user experience. As used in this disclosure, "sentiment data" is information derived from an analysis of a user's emotional tone, attitude, or mood. The sentiment data 176 may be extracted from text, voice, or other multimodal inputs of the user input 112 and may be generated using natural language processing techniques, tone analysis, or behavioral analysis. Sentiment data 176 may indicate whether a user is expressing emotions such as frustration, joy, confidence, confusion, and the like, and may allow the chatbot 170 to adapt the custom responses accordingly. In a non-limiting example, sentiment data 176 may be identified from a user's typed query, such as "I don't understand this topic at all," which may indicate frustration or a need for simpler explanations. The chatbot 170 may analyze vocal inputs for tone, such as a rising pitch or hesitancy, which may suggest uncertainty. Continuing, by leveraging sentiment data 176, the chatbot 170 may provide more empathetic and supportive responses tailored to the user's emotional state, such as offering encouragement, simplifying content, or providing additional resources. As used in this disclosure, "custom response" is an output generated by the chatbot 170 that is uniquely tailored to a user's input. Without limitation, the custom response may be designed to address the user's needs in a personalized and relevant manner by incorporating user specific data 174, sentiment data 176, or situational context. Custom responses may vary in content, tone, or delivery format depending on the user's requirements and/or interaction history. In a non-limiting example, the custom response for a user preparing for the Bar Exam may include a step-by-step explanation of a complex legal concept, accompanied by suggested case law references and practice questions. If sentiment data 176 indicates the user is struggling, the chatbot 170 may adapt its tone to provide reassurance, such as, "This topic can be challenging, but you're doing great, here's a simplified breakdown to help." Additionally and or alternatively, for users with accessibility needs, the custom response may include closed captions, visual aids, and/or alternative formats to ensure inclusivity. Without limitation, by generating custom responses, the chatbot 170 may enhance user engagement, efficiency, and overall experience.

With continued reference to FIG. 1, the processor 102 may be further configured to receive user feedback 178 and refine the machine learning model 132 by identifying patterns 180 between a target output 182 and the user specific output 150, calculating a score 184 for the user specific output 150 based on the user feedback 178, and updating a parameter 186 of the machine learning model 132 as a function of the score 184. As used in this disclosure, a "target output" is the output generated by the apparatus 100 that most closely aligns with the user's needs, preferences, or expectations. The target output 182 may represent the ideal result or response that the user seeks, and it may vary depending on the context, the user's specific query, or the interaction. In a non-limiting example, the target output 182 may be a clear and concise explanation of a legal concept for a law student or a visual representation of a mathematical formula for a visual learner. In an embodiment, the target output 182 may be iteratively refined as the user grows and changes. In an embodiment, the apparatus 100 may adapt to better approximate the user's ideal target output 182 by analyzing user feedback 178 and adjusting its processing accordingly. As used in this disclosure, a "score" is a quantitative or qualitative metric calculated by the apparatus 100 to evaluate how closely the user specific output 150 aligns with the target output 182. The score 184 may be based on user feedback 178, such as explicit ratings, selections, or corrections, as well as implicit feedback, such as time spent reviewing the user specific output 150 or behavioral cues indicating satisfaction or dissatisfaction. In a non-limiting example, the apparatus 100 may assign a high score 184 to the user specific output 150 if the user marks it as helpful, while a lower score 184 may indicate the need for further refinement. Without limitation, the score 184 may serve as a critical benchmark for improving the accuracy and relevance of the machine learning model 132. In a non-limiting example, the score 184 may be derived from a star rating system or implicit user feedback 178. For example, if the user responds to the user specific output 150 with a rating of 4 out of 5 stars, the apparatus 100 may assign a score 184 of 80% to indicate that the user specific output 150 is close to, but not fully aligned with, the target output 182. Additionally and or alternatively, the apparatus 100 may monitor implicit feedback, such as the user spending less time engaging with the user specific output 150 or quickly asking for clarification, to infer a lower score 184. For instance, without limitation, if the user immediately rephrases the query as "Can you simplify this explanation?" the apparatus 100 may assign a score 184 of 60%, indicating that the initial response required significant improvement. As used in this disclosure, "user feedback" is information provided by a user, either explicitly or implicitly, that indicates their level of satisfaction with respect to the outputs of the apparatus 100. Without limitation, user feedback 178 may be used to evaluate how well the user specific output 150 aligns with the user's expectations or the target output 182 and may serve as a basis for refining the performance and adaptability of the machine learning model 132. In a non-limiting example, explicit user feedback 178 may include direct input such as ratings, comments, and/or selections, such as giving a thumbs-up or thumbs-down on the user specific output 150, providing a numerical rating (e.g., 4 out of 5 stars), or typing, "This explanation is too complex-simplify it." Implicit user feedback 178 may involve indirect behavioral cues, such as the time spent reviewing the user specific output 150, rephrasing a query, clicking additional resources, and/or abandoning the interaction. Continuing, both forms of user feedback 178 may allow the apparatus 100 to identify patterns 180, adjust the user specific output 150, and improve its ability to meet the user's specific needs.

With continued reference to FIG. 1, as used in this disclosure, a "parameter" is a configurable element of the machine learning model 132 that influences how it processes data and generates the output. Parameters 186 may include weights, thresholds, or rules that the machine learning model 132 adjusts during training or fine-tuning to improve its performance. In a non-limiting example, a parameter 186 may determine how heavily the machine learning model 132 considers certain features of the user input 112, such as text complexity, sentiment data 176, or past preferences. Continuing, by updating the parameter 186 as a function of the score 184, the machine learning model 132 may iteratively refine its ability to generate user specific outputs 150 that better match the target output 182, thereby enhancing its overall effectiveness and personalization. In a non-limiting example, the parameter 186 of the machine learning model 132 may determine the balance between technical and simplified language in the output. If the user frequently requests more straightforward explanations, the apparatus 100 may adjust a "complexity threshold" parameter 186 to prioritize simpler language and examples. Similarly, another parameter 186 may control the relevance of visual aids. If the user consistently responds positively to user specific outputs 150 that include diagrams or flowcharts, the apparatus 100 may update a "visual content weight" parameter 186 to ensure more visual aids are included in future outputs. Without limitation, the parameter 186 adjustments may enable the machine learning model 132 to iteratively improve and align its outputs with the user's expectations and feedback.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
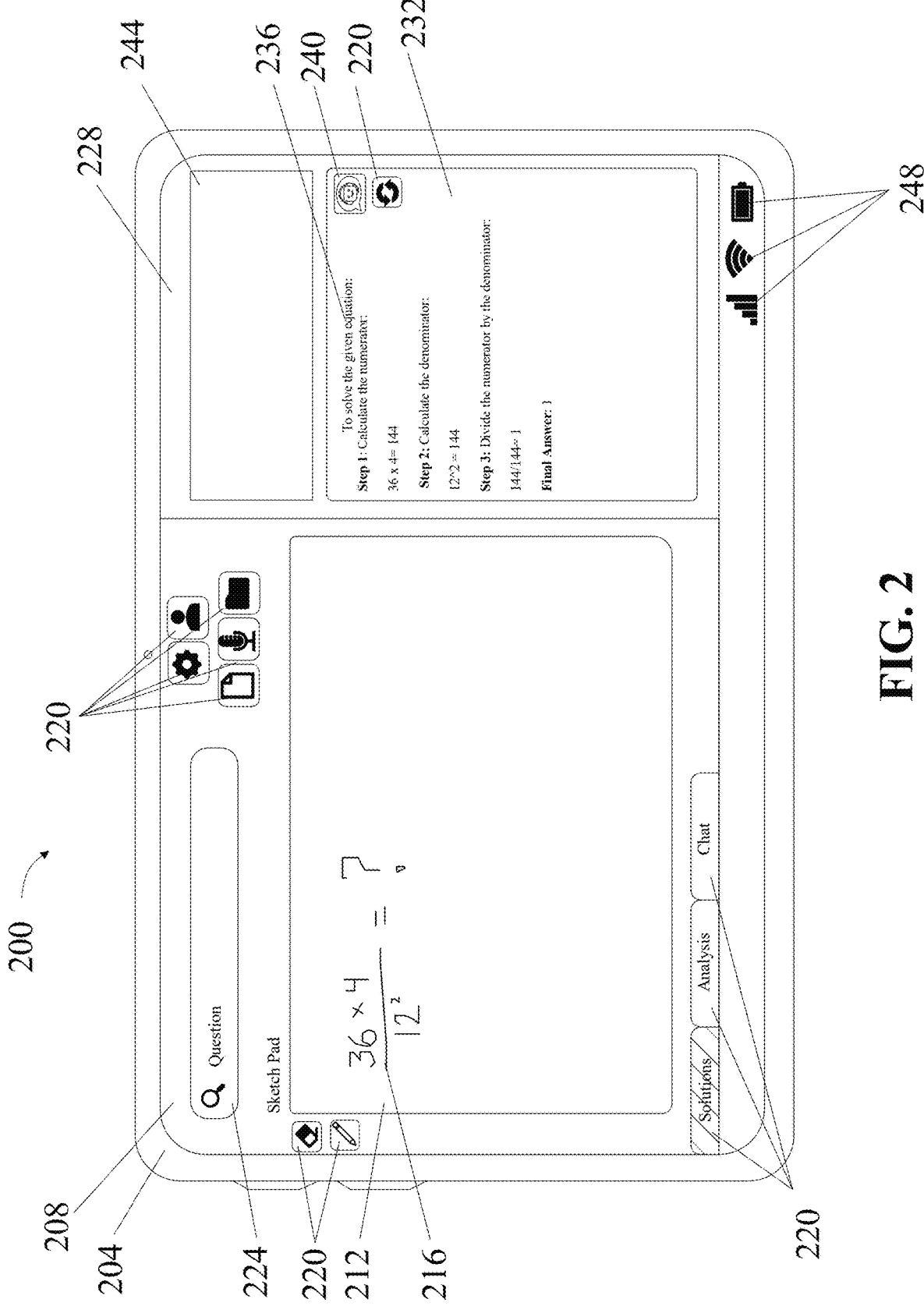
FIG. 2 is an exemplary illustration of a graphical user interface which includes a first window and a second window.

Referring now to FIG. 2, an exemplary illustration 200 of a graphical user interface. In an embodiment, the illustration 200 includes a downstream device 204. In an embodiment, the downstream device 204 displays the graphical user interface 208. In an embodiment, the graphical user interface 208 includes a first window 212. In an embodiment, the graphical user interface 208 includes a user input 216. In an embodiment, the graphical user interface 208 includes at least an interactive element 220. In an embodiment, the at least an interactive element 220 may include a pencil icon. As used in this disclosure, a "pencil icon" is an interactive element that allows users to edit or create content. In an embodiment, the pencil icon may allow the user to create text, drawings, or annotations. In an embodiment, the at least an interactive element 220 may include an eraser icon. As used in this disclosure, an "eraser icon" is an interactive element enabling users to delete or remove content. In an embodiment, the content may include text, drawings, or annotations, from a document or interface. In an embodiment, the at least an interactive element 220 may include a refresh icon. As used in this disclosure, a "refresh icon" is an interactive element that indicates the action of reloading or updating a page or section of the interface, or resetting content or settings to their original state. In an embodiment, the at least an interactive element 220 may include a gear icon. As used in this disclosure, a "gear icon" is an interactive element that provides access to settings or configuration options, allowing users to adjust preferences, customize features, or manage administrative tools. In an embodiment, the at least an interactive element 220 may include a user icon. As used in this disclosure, a "user icon" is an interactive element that represents user profiles or account management, providing access to personal information, account settings, or profile customization. In an embodiment, the at least an interactive element 220 may include a new page icon. As used in this disclosure, a "new page icon" signifies an interactive element that allows users to create or open a new document, project, or workspace, enabling them to start fresh without affecting existing content. In an embodiment, the at least an interactive element 220 may include a speaker icon. As used in this disclosure, a "speaker icon" represents an interactive element associated with audio controls, such as volume adjustments, muting, enabling sound-related features. In an embodiment, the sound related features may include notifications or media playback, or uploading oral content from a speaker. In an embodiment, the at least an interactive element 220 may include a folder icon. As used in this disclosure, a "folder icon" is an interactive element that represents file management functionalities. Continuing, the functionalities may include organizing, storing, or accessing grouped files or documents. In an embodiment, the at least an interactive element 220 may include a solutions tab. In an embodiment, the at least an interactive element 220 may include an analysis tab. In an embodiment, the at least an interactive element 220 may include a chat tab. As used in this disclosure, a "tab" is an interactive element within a user interface that organizes, categorizes, or provides access to different sections of the graphical user interface. Tabs may be displayed as labeled clickable regions, buttons, and/or headers that allow users to switch between different content areas or tools without navigating away from the main interface. In the described embodiments, a "solutions tab," "analysis tab," and "chat tab" may represent distinct interactive elements designed to provide access to specific functionalities. For instance, without limitation, the solutions tab may present problem-solving tools or resources, an analysis tab may display data evaluation or reporting tools, and a chat tab may provide messaging or collaborative communication capabilities. Continuing, the tabs may serve to streamline navigation, improve organization, and enhance the user experience by grouping related content or actions under intuitive, easily accessible labels. In an embodiment, the graphical user interface 208 includes a text input field 224. In an embodiment, the graphical user interface 208 includes a second window 228. In an embodiment, the graphical user interface 208 includes an output element 232. In an embodiment, the graphical user interface 208 includes a user specific output 236. In an embodiment, the graphical user interface 208 includes a chatbot icon 240. In an embodiment, the graphical user interface 208 includes a resource window 244. In an embodiment, the graphical user interface 208 includes information icons 248. In an embodiment, the information icons 248 includes a battery icon. In an embodiment, the information icons 248 includes a Wi-Fi icon. In an embodiment, the information icons 248 includes a service icon.

Figure 3:
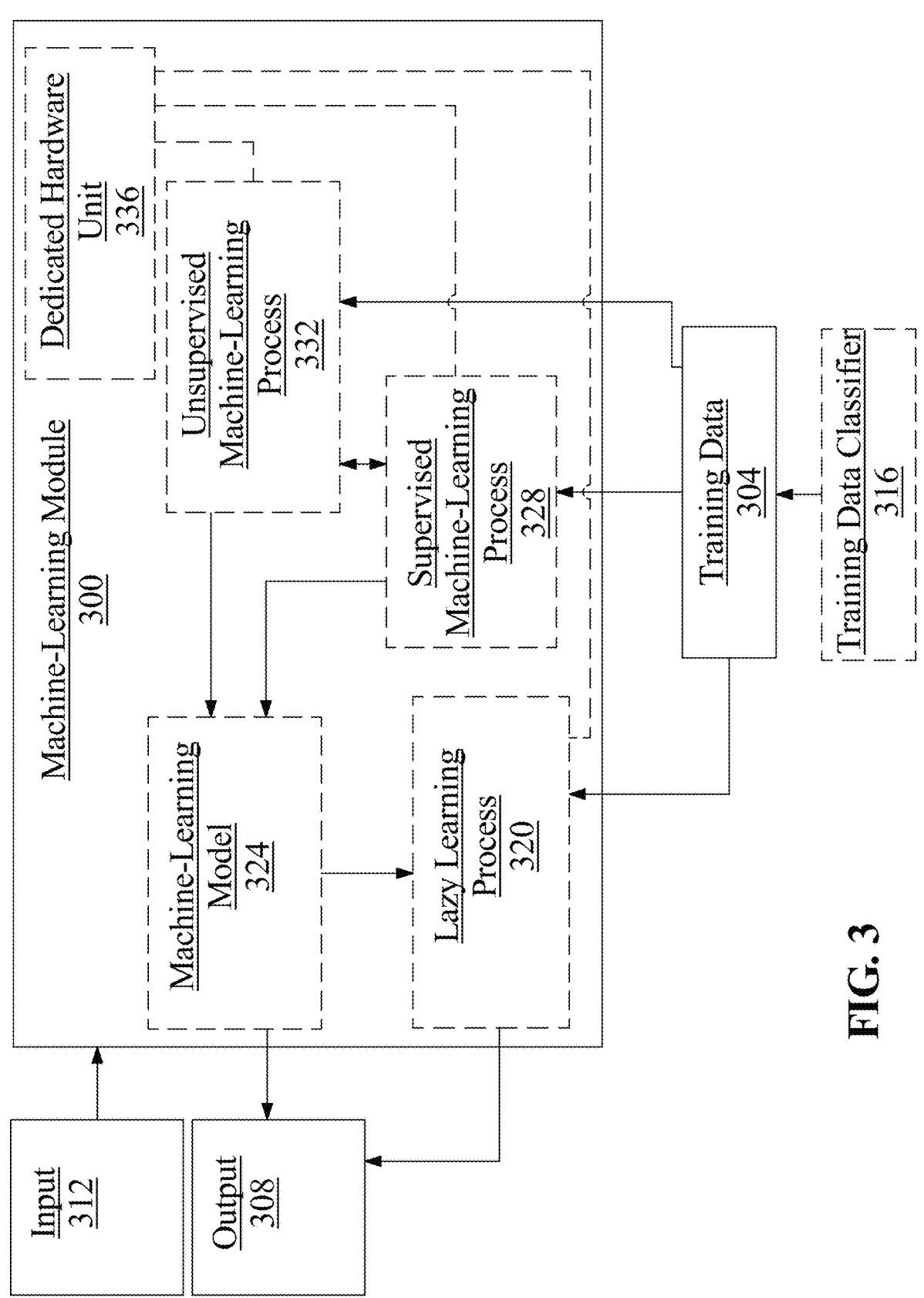
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data 114, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include user input and outputs may include user specific output.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to something that characterizes a sub-population, such as a cohort of students preparing for standardized exams like the LSAT or Bar Exam. Alternatively, it may classify data related to specific analyzed items, such as user behaviors indicating preferred learning styles (e.g., visual learners or auditory learners), or phenomena such as sentiment trends among users struggling with particular topics. This classification may enable the system to identify and select subsets of training data tailored to refine outputs for these distinct sub-populations or contextual scenarios.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the 25th percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include user input as described above as inputs, user specific output as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task clastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
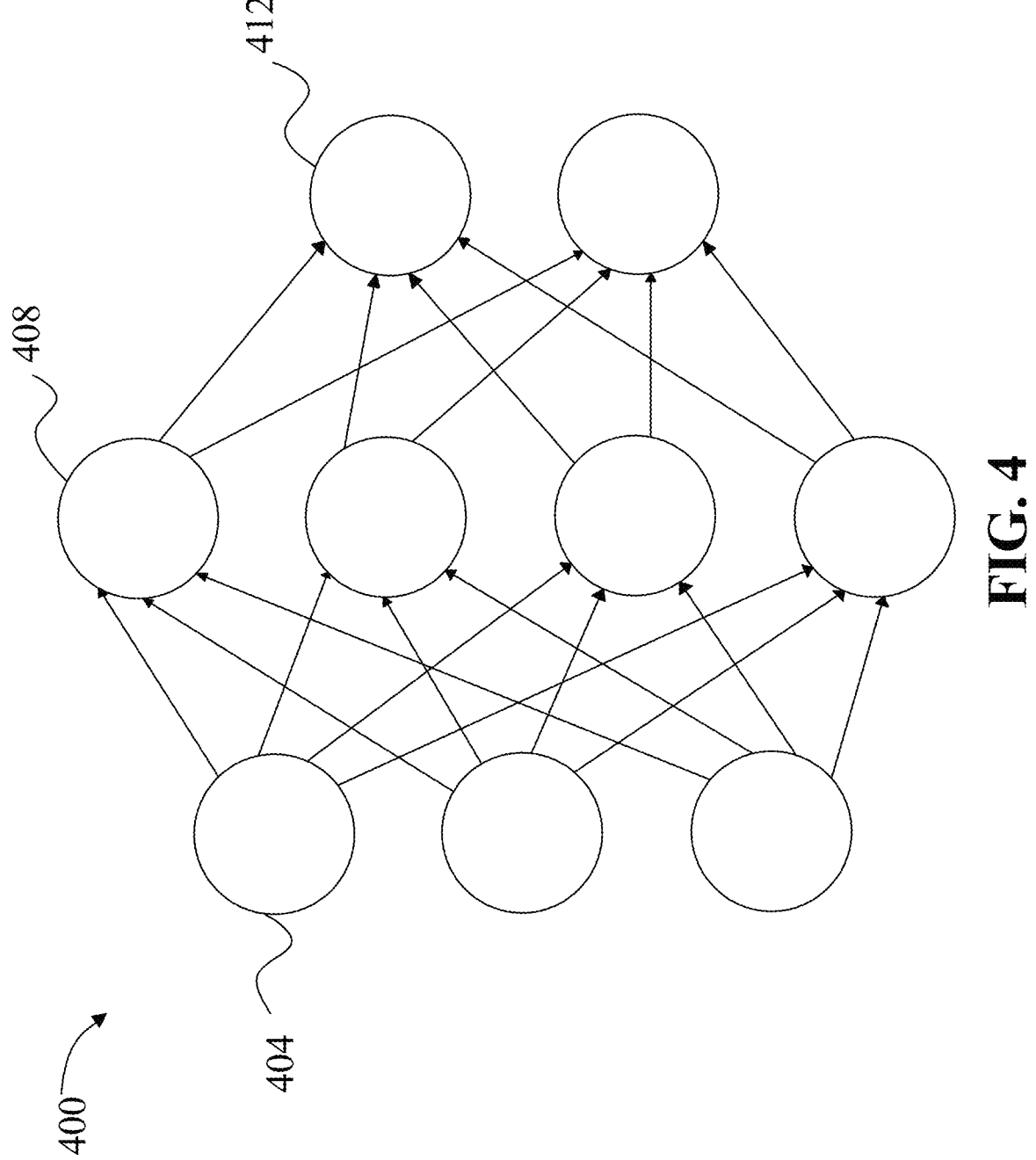
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
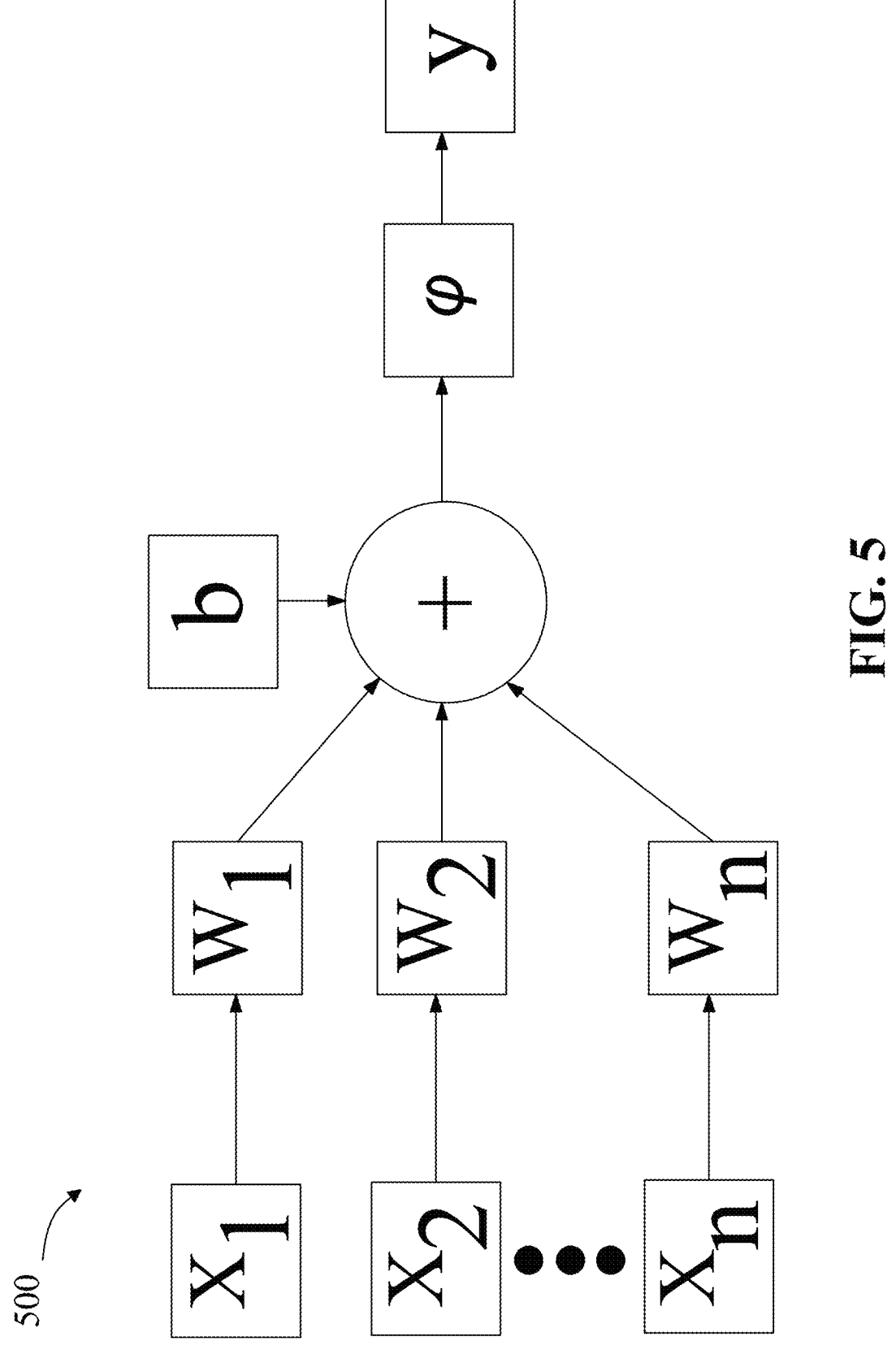
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tan h (hyperbolic tangent) function, of the form $$\frac{e^x - e^{-x}}{e^x + e^{-x}},$$

a tan h derivative function such as $f(x) = \tan h^2(x)$, a rectified linear unit function such as $f(x) = \max(0, x)$, a "leaky" and/or "parametric" rectified linear unit function such as $f(x)=\max(ax,x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $$f(x) = a\left(1 + \tanh\left(\sqrt{2/\pi}\,(x + bx^r)\right)\right)$$

for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs x; that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function q, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w; may be determined by training a neural network using training data, which may be performed using any suitable process as described above.

Figure 6:
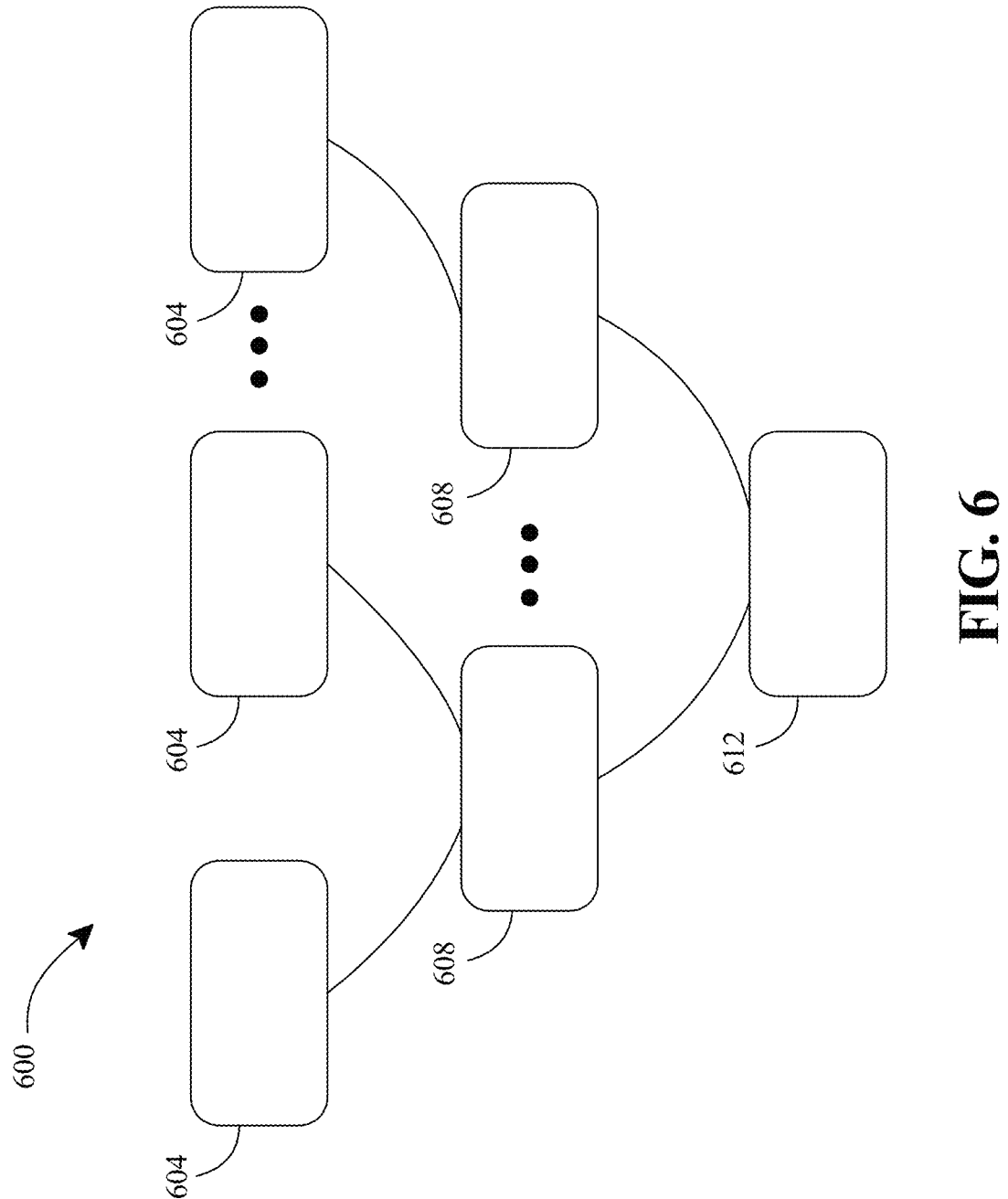
FIG. 6 is an exemplary diagram of a cryptographic accumulator.

Referring now to FIG. 6, an exemplary embodiment of a cryptographic accumulator 600 is illustrated. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or nonmembership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 600 has a plurality of accumulated elements 604, each accumulated element 604 generated from a lot of the plurality of data lots. Accumulated elements 604 are create using an encryption process, defined for this purpose as a process that renders the lots of data unintelligible from the accumulated elements 604; this may be a one-way process such as a cryptographic hashing process and/or a reversible process such as encryption. Cryptographic accumulator 600 further includes structures and/or processes for conversion of accumulated elements 604 to root 612 element. For instance, and as illustrated for exemplary purposes in FIG. 6 cryptographic accumulator 600 may be implemented as a Merkle tree and/or hash tree, in which each accumulated element 604 created by cryptographically hashing a lot of data. Two or more accumulated elements 604 may be hashed together in a further cryptographic hashing process to produce a node 608 element; a plurality of node 608 elements may be hashed together to form parent nodes 608, and ultimately a set of nodes 608 may be combined and cryptographically hashed to form root 612. Contents of root 612 may thus be determined by contents of nodes 608 used to generate root 612, and consequently by contents of accumulated elements 604, which are determined by contents of lots used to generate accumulated elements 604. As a result of collision resistance and avalanche effects of hashing algorithms, any change in any lot, accumulated element 604, and/or node 608 is virtually certain to cause a change in root 612; thus, it may be computationally infeasible to modify any element of Merkle and/or hash tree without the modification being detectable as generating a different root 612. In an embodiment, any accumulated element 604 and/or all intervening nodes 608 between accumulated element 604 and root 612 may be made available without revealing anything about a lot of data used to generate accumulated element 604; lot of data may be kept secret and/or demonstrated with a secure proof as described below, preventing any unauthorized party from acquiring data in lot.

Alternatively or additionally, and still referring to FIG. 6, cryptographic accumulator 600 may include a "vector commitment" which may act as an accumulator in which an order of elements in set is preserved in its root 612 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 600 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e., given an input it is easy to produce an output of the one-way function but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Figure 7:
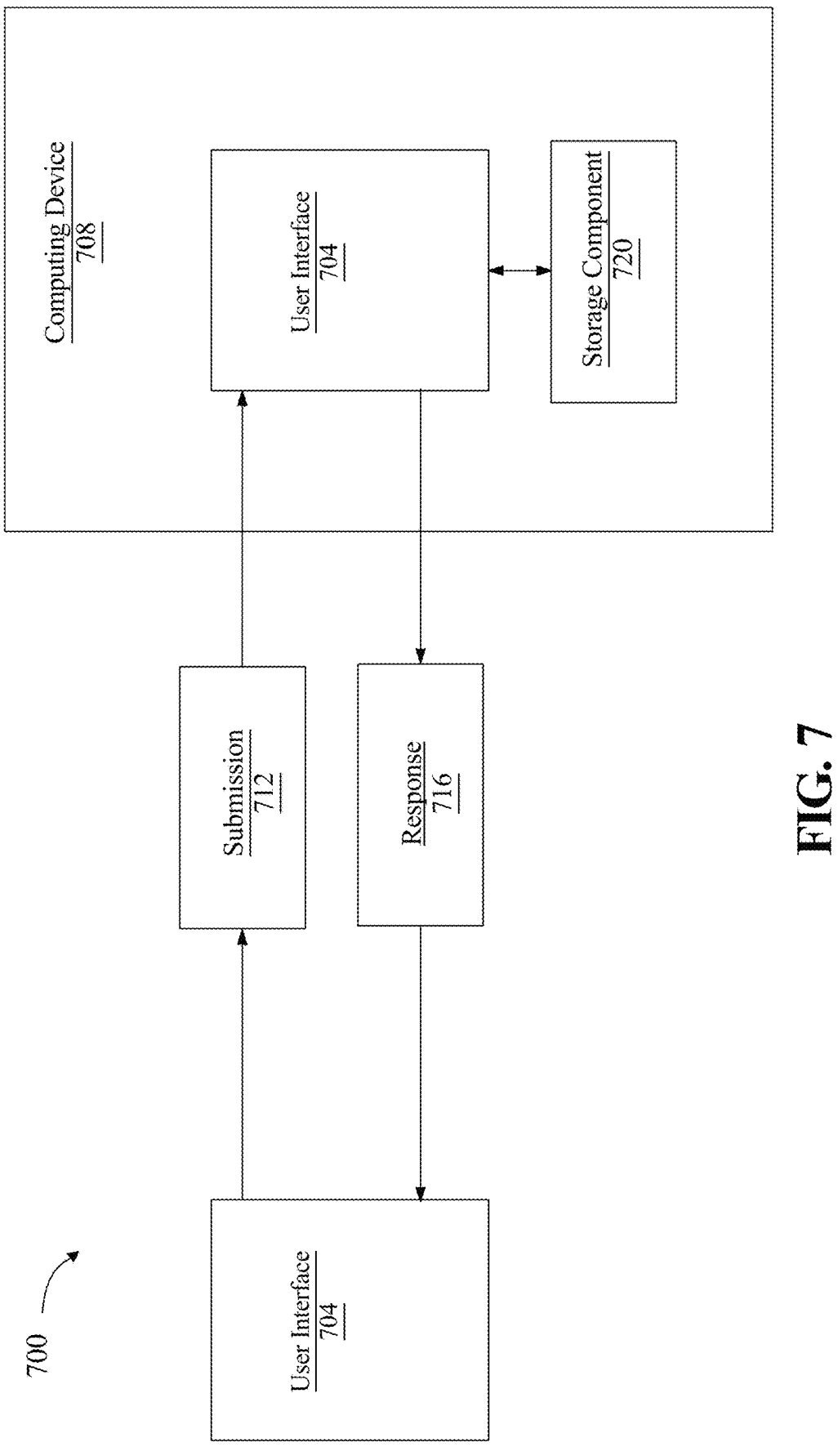
FIG. 7 is a diagram of an exemplary embodiment of a chatbot.

Referring to FIG. 7, a chatbot system 700 is schematically illustrated. According to some embodiments, a user interface 704 may be communicative with a computing device 708 that is configured to operate a chatbot. In some cases, user interface 704 may be local to computing device 708. Alternatively or additionally, in some cases, user interface 704 may remote to computing device 708 and communicative with the computing device 708, by way of one or more networks, such as without limitation the internet. Alternatively or additionally, user interface 704 may communicate with user device 708 using telephonic devices and networks, such as without limitation fax machines, short message service (SMS), or multimedia message service (MMS). Commonly, user interface 704 communicates with computing device 708 using text-based communication, for example without limitation using a character encoding protocol, such as American Standard for Information Interchange (ASCII). Typically, a user interface 704 conversationally interfaces a chatbot, by way of at least a submission 712, from the user interface 704 to the chatbot, and a response 716, from the chatbot to the user interface 704. In many cases, one or both submission 712 and response 716 are text-based communication. Alternatively or additionally, in some cases, one or both of submission 712 and response 716 are audio-based communication.

Continuing in reference to FIG. 7, a submission 712 once received by computing device 708 operating a chatbot, may be processed by a processor. In some embodiments, processor processes submission 712 using one or more of keyword recognition, pattern matching, and natural language processing. In some embodiments, processor employs real-time learning with evolutionary algorithms. In some cases, processor may retrieve a pre-prepared response from at least a storage component 720, based upon submission 712. Alternatively or additionally, in some embodiments, processor communicates a response 716 without first receiving a submission 712, thereby initiating conversation. In some cases, processor communicates an inquiry to user interface 704; and the processor is configured to process an answer to the inquiry in a following submission 712 from the user interface 704. In some cases, an answer to an inquiry present within submission 712 from a user interface 704 may be used by computing device as an input to another function.

Referring now to FIG. 8, a flow diagram of an exemplary method 800 for generating a learning environment comprising an interactive, multi-window graphical user interface is illustrated. At step 805, method 800 includes generating a graphical user interface, where in the graphical user interface comprises a first window comprising an interactive workspace, wherein the interactive workspace is configured to receive user input comprising one or more of textual data and image data and a second window communicatively connected to the first window, wherein the second window comprises an output element that is configured to interface with a machine learning model. In an embodiment, the first window may be configured to provide a drawing input portion, wherein the drawing input portion is configured to receive a drawing and provide a text input field, wherein the text input field is configured to receive text data. In an embodiment, the machine learning model may include a large language model, wherein the large language model configured to receive a second query, adjust the user specific output as a function of the second query, and generate an alternative user specific output. In an embodiment, the machine learning model may be iteratively trained using machine learning model training data, wherein the machine learning model training data may include historical return data corresponding to historical processed multimodal data. This may be implemented as described and with reference to FIGS. 1-7.

Still referring to FIG. 8, at step 810, method 800 includes displaying the graphical user interface using a downstream device. This may be implemented as described and with reference to FIGS. 1-7.

Still referring to FIG. 8, at step 815, method 800 includes receiving, through the graphical user interface of the downstream device, a first query associated with user input, wherein the first query comprises multimodal data. In an embodiment, the multimodal data may include at least an event corresponding to an event handler, wherein the at least an event comprises one or more of uploading image data of the multimodal data and submitting text data of the multimodal data. This may be implemented as described and with reference to FIGS. 1-7.

Still referring to FIG. 8, at step 820, method 800 includes generating, using the machine learning model, return data as a function of processed multimodal data. This may be implemented as described and with reference to FIGS. 1-7.

Still referring to FIG. 8, at step 825, method 800 includes modifying, using a natural language processor, the return data as a function of an attribute of the processed multimodal data to generate a user specific output. In an embodiment, the second window may be adjacent to the first window, wherein the second window may be configured to display, the user specific output and dynamically provide updates to the user specific output based on real-time user interactions. In an embodiment, the apparatus 100 may further include an application programming interface compatible with an interactive workspace, wherein the application programming interface is configured to receive and transmit the multimodal data between the downstream device and the apparatus and provide dynamic updates of the user specific output within the interactive workspace. This may be implemented as described and with reference to FIGS. 1-7.

Still referring to FIG. 8, at step 830, method 800 includes displaying, using the second window of the graphical user interface, the user specific output. In an embodiment, the apparatus may further include a chatbot, wherein the chatbot is configured to receive a plurality of user queries, respond to the plurality of user queries, wherein responding to the plurality of queries comprises retrieving a plurality of user specific data of the input data, analyzing sentiment data of the user specific data, and generating, using the natural language processor, custom responses as a function of the user specific data and the sentiment data. In an embodiment, the apparatus may further be configured to generate, using an image processor, the processed multimodal data by identifying, using edge detection techniques, features of the multimodal data. In an embodiment, the processor may be further configured to receive user feedback and refine the machine learning model by identifying patterns between a target output and the user specific output, calculating a score for the user specific output based on the user feedback, and updating a parameter of the machine learning model as a function of the score. This may be implemented as described and with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
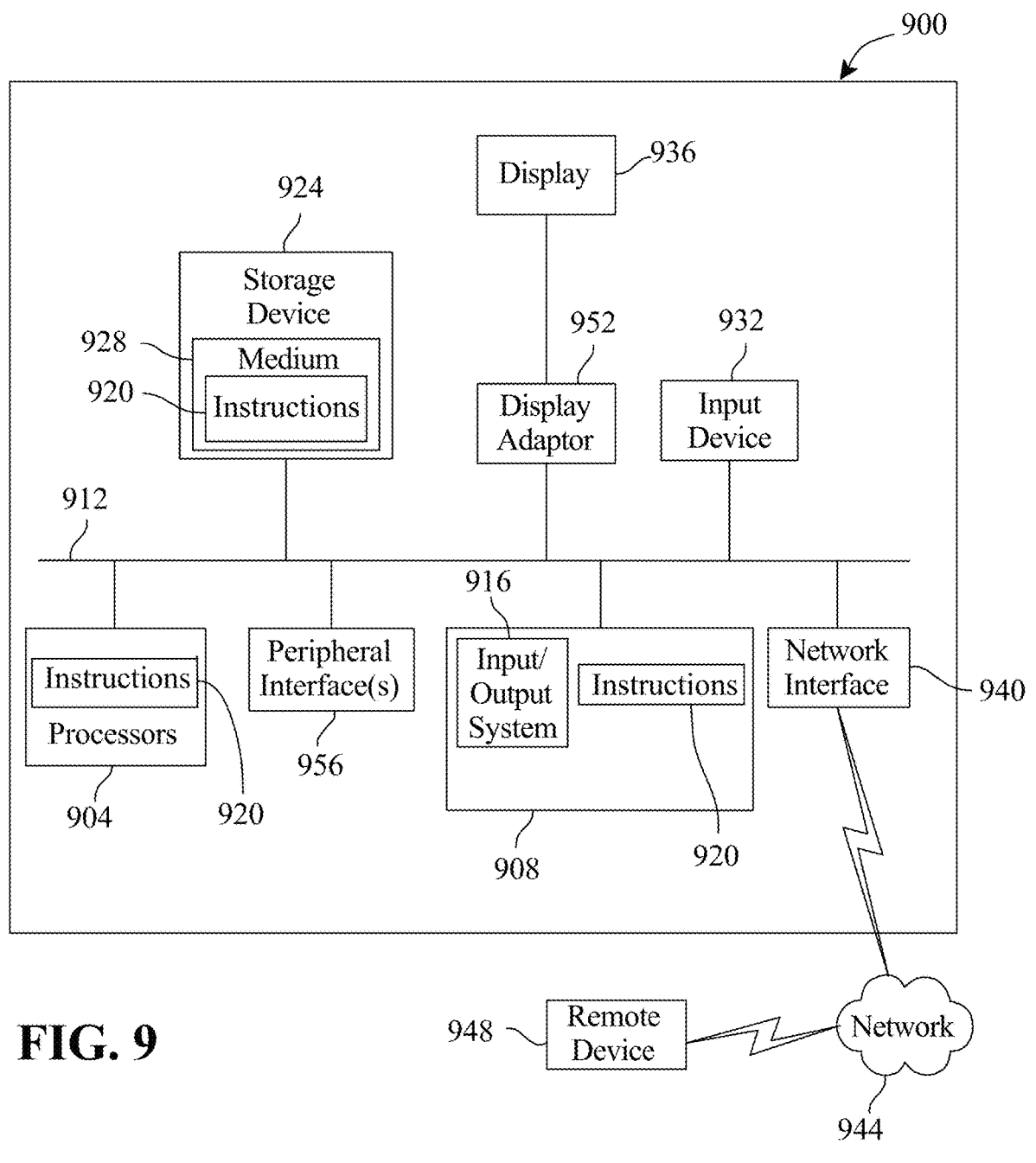
FIG. 9 is a block diagram of a computing system that can be used to implement any one or more of the methodologies disclosed herein and any one or more portions thereof.

FIG. 9 shows a diagrammatic representation of one embodiment of computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display device 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a learning environment comprising an interactive, multi-window graphical user interface, wherein the apparatus comprises:

at least a computing device, wherein the computing device comprises:

a memory; and at least a processor communicatively connected to the memory, wherein the memory contains instructions configuring the at least a processor to:

generate a graphical user interface, wherein the graphical user interface comprises:

a first window comprising an interactive workspace, wherein the interactive workspace is configured to receive user input comprising one or more of textual data and image data, wherein the first window is configured to provide a drawing input portion, wherein the drawing input portion is configured to receive a drawing input comprising at least user-generated visual elements from a user; and a second window communicatively connected to the first window, wherein the second window comprises an output element that is configured to interface with a machine learning model;

display the graphical user interface using a downstream device;

receive, through the graphical user interface of the downstream device, a first query associated with user input, wherein the first query comprises multimodal data;

generate, using the machine learning model, return data as a function of processed multimodal data which comprises analyzing user's complexity of text input to determine user's educational level;

modify, using a natural language processor, the return data as a function of an attribute of the processed multimodal data to generate a user specific output; and display, using the second window of the graphical user interface, the user specific output, wherein displaying the user specific output comprises providing at least a tailored learning support program based on the determined user's educational level and a hint, wherein providing the at least a hint comprises highlighting an error made by the user.

2. The apparatus of claim 1, wherein the multimodal data comprises at least an event corresponding to an event handler, wherein the at least an event comprising one or more of:

uploading the image data of the multimodal data; and submitting the textual data of the multimodal data.

3. The apparatus of claim 1, further comprising an application programming interface compatible with the interactive workspace, wherein the application programming interface is configured to:

receive and transmit the multimodal data between the downstream device and the apparatus; and provide dynamic updates of the user specific output within the interactive workspace.

4. The apparatus of claim 1, wherein the machine learning model comprises a large language model, wherein the large language model configured to:

receive a second query;

adjust the user specific output as a function of the second query; and generate an alternative user specific output.

5. The apparatus of claim 1, wherein the first window is configured to provide a text input field, wherein the text input field is configured to receive the textual data from a user.

6. The apparatus of claim 5, wherein the second window is arranged adjacent to the first window, wherein the second window is configured to:

display, the user specific output; and dynamically provide updates to the user specific output based on real-time user interactions.

7. The apparatus of claim 1, further comprising a chatbot, wherein the chatbot is configured to:

receive a plurality of user queries;

respond to the plurality of user queries, wherein responding to the plurality of user queries comprises:

retrieving a plurality of user specific data of the user input;

analyzing sentiment data of the plurality of user specific data; and generating, using the natural language processor, custom responses in the second window as a function of the user specific data and the sentiment data.

8. The apparatus of claim 1, wherein the machine learning model is iteratively trained using machine learning model training data, wherein the machine learning model training data comprises historical return data corresponding to historical processed multimodal data.

9. The apparatus of claim 1, further configured to generate, using an image processor, the processed multimodal data by identifying, using edge detection techniques, features of the multimodal data.

10. The apparatus of claim 1, wherein the processor is further configured to:

receive user feedback; and refine the machine learning model by:

identifying patterns in between a target output and the user specific output;

calculating a score for the user specific output based on the user feedback and the patterns; and updating a parameter of the machine learning model as a function of the score.

11. A method for generating a learning environment comprising an interactive, multi-window graphical user interface, wherein the method comprises:

generating a graphical user interface using at least a processor, wherein the graphical user interface comprises:

a first window comprising an interactive workspace, wherein the interactive workspace is configured to receive user input comprising one or more of textual data and image data, wherein the first window is configured to provide a drawing input portion, wherein the drawing input portion is configured to receive a drawing input comprising at least user-generated visual elements from a user; and a second window communicatively connected to the first window, wherein the second window comprises an output element that is configured to interface with a machine learning model;

displaying the graphical user interface using a downstream device;

receiving, through the graphical user interface of the downstream device, a first query associated with user input, wherein the first query comprises multimodal data;

generating, using the machine learning model, return data as a function of processed multimodal data which comprises analyzing user's complexity of text input to determine user's educational level;

modifying, using a natural language processor, the return data as a function of an attribute of the processed multimodal data to generate a user specific output; and displaying, using the second window of the graphical user interface, the user specific output, wherein displaying the user specific output comprises providing at least a tailored learning support program based on the determined user's educational level and a hint, wherein providing the at least a hint comprises highlighting an error made by the user.

12. The method of claim 11, wherein the multimodal data comprises at least an event corresponding to an event handler, wherein the at least an event comprising one or more of:

uploading the image data of the multimodal data; and submitting the textual data of the multimodal data.

13. The method of claim 11, further comprising an application programming interface compatible with the interactive workspace, wherein the application programming interface is configured to:

receive and transmit the multimodal data to the downstream device; and provide dynamic updates of the user specific output within the interactive workspace.

14. The method of claim 11, wherein the machine learning model comprises a large language model, wherein the large language model configured to:

receive a second query;

adjust the user specific output as a function of the second query; and generate an alternative user specific output.

15. The method of claim 11, wherein the first window is configured to provide a text input field, wherein the text input field is configured to receive the textual data from a user.

16. The method of claim 15, wherein the second window is arranged adjacent to the first window, wherein the second window is configured to:

display, the user specific output; and dynamically provide updates to the user specific output based on real-time user interactions.

17. The method of claim 11, further comprising a chatbot, wherein the chatbot is configured to:

receive a plurality of user queries;

respond to the plurality of user queries, wherein responding to the plurality of queries comprises:

retrieving a plurality of user specific data of the user input;

analyzing sentiment data of the plurality of user specific data; and generating, using the natural language processor, custom responses in the second window as a function of the user specific data and the sentiment data.

18. The method of claim 11, wherein the machine learning model is iteratively trained using machine learning model training data, wherein the machine learning model training data comprises historical return data corresponding to historical processed multimodal data.

19. The method of claim 11, further comprising generating, using an image processor, the processed multimodal data by identifying, using edge detection techniques, features of the multimodal data.

20. The method of claim 11, further comprising:

receiving, using the at least a processor, user feedback; and refining, using the at least a processor, the machine learning model by:

identifying patterns in between a target output and the user specific output;

calculating a score for the user specific output based on the user feedback and the patterns; and updating a parameter of the machine learning model as a function of the score.

\* \* \* \* \*